(12) United States Patent
Du

(10) Patent No.: US 9,838,588 B2
(45) Date of Patent: Dec. 5, 2017

(54) USER INFORMATION ACQUISITION METHOD AND USER INFORMATION ACQUISITION APPARATUS

(71) Applicant: BEIJING ZHIGU RUI TUO TECH CO., LTD., Beijing (CN)

(72) Inventor: Lin Du, Beijing (CN)

(73) Assignee: BEIJING ZHIGU RUI TUO TECH CO., LTD., Beijing (CN)

( * ) Notice: Subject to any disclaimer, the term of this patent is extended or adjusted under 35 U.S.C. 154(b) by 103 days.

(21) Appl. No.: 14/888,204

(22) PCT Filed: Jan. 22, 2014

(86) PCT No.: PCT/CN2014/071141
§ 371 (c)(1),
(2) Date: Oct. 30, 2015

(87) PCT Pub. No.: WO2015/070536
PCT Pub. Date: May 21, 2015

(65) Prior Publication Data
US 2016/0073002 A1    Mar. 10, 2016

(30) Foreign Application Priority Data

Nov. 15, 2013 (CN) .......................... 2013 1 0572154

(51) Int. Cl.
*G06K 9/00* (2006.01)
*H04N 5/232* (2006.01)
(Continued)

(52) U.S. Cl.
CPC ......... *H04N 5/23203* (2013.01); *G06F 1/163* (2013.01); *G06F 3/0488* (2013.01);
(Continued)

(58) Field of Classification Search
CPC ............ H04N 5/23203; H04N 5/23229; G06F 1/163; G06F 21/31; G06F 21/16; G06F 3/0488
See application file for complete search history.

(56) References Cited

U.S. PATENT DOCUMENTS 6,580,815 B1 * 6/2003 Grajewski ............... G06F 21/32
340/5.53
8,136,053 B1   3/2012 Miller et al.
(Continued)

FOREIGN PATENT DOCUMENTS

CN      102004870 A      4/2011
CN      103116717    *   1/2013
(Continued)

OTHER PUBLICATIONS

Machine Translation of Yushun CN 103116717, espacenet, 2013.*
(Continued)

*Primary Examiner* — John Strege

(57) ABSTRACT

The present application discloses a user information acquisition method and a user information acquisition apparatus. The method comprises: acquiring an image comprising at least one digital watermark; acquiring user related information corresponding to a current user and comprised in the at least one digital watermark, wherein the user related information comprises application startup information used to start a corresponding application; and projecting the user related information to a fundus of the user. The present application enables a user to start a corresponding application rapidly, securely, and conveniently.

28 Claims, 13 Drawing Sheets

(51) Int. Cl.
*G06F 3/0488* (2013.01)
*G06F 21/16* (2013.01)
*G06F 1/16* (2006.01)
*G06F 21/31* (2013.01)

(52) U.S. Cl.
CPC .............. *G06F 21/16* (2013.01); *G06F 21/31* (2013.01); *H04N 5/23229* (2013.01)

(56) References Cited

U.S. PATENT DOCUMENTS

| | | | | |
|---|---|---|---|---|
| 8,965,460 | B1* | 2/2015 | Rao | G06F 3/005 455/566 |
| 9,331,856 | B1* | 5/2016 | Song | H04L 9/3247 |
| 2002/0023218 | A1* | 2/2002 | Lawandy | G06F 17/30876 713/176 |
| 2002/0033844 | A1* | 3/2002 | Levy | G06F 21/10 715/744 |
| 2008/0049971 | A1* | 2/2008 | Ramos | G06F 17/30026 382/100 |
| 2010/0114344 | A1* | 5/2010 | Hannaby | G06Q 30/02 700/94 |
| 2010/0226526 | A1* | 9/2010 | Modro | G06K 9/00577 382/100 |
| 2013/0024698 | A1* | 1/2013 | Tadano | G06F 21/16 713/176 |
| 2013/0300652 | A1 | 11/2013 | Raffle et al. | |
| 2014/0274353 | A1* | 9/2014 | Benson | G06F 3/01 463/29 |
| 2015/0002676 | A1* | 1/2015 | Yoo | G02B 27/017 348/159 |
| 2015/0058623 | A1* | 2/2015 | Taylor | G06F 21/16 713/165 |

FOREIGN PATENT DOCUMENTS

| | | |
|---|---|---|
| CN | 102970307 A | 3/2013 |
| CN | 103018914 A | 4/2013 |
| CN | 103116717 A | 5/2013 |
| CN | 103150013 A | 6/2013 |
| CN | 103310142 A | 9/2013 |
| WO | WO 2013/012603 A1 | 1/2013 |

OTHER PUBLICATIONS

PCT International Search Report dated Aug. 26, 2014, issued in corresponding International Application No. PCT/CN2014/071141 (5 pages).
Office Action for CN App. No. 201310572154.3, dated Feb. 1, 2016, 32 pages.
Office Action for CN App. No. 201310572154.3, dated Oct. 14, 2016, 27 pages.

* cited by examiner

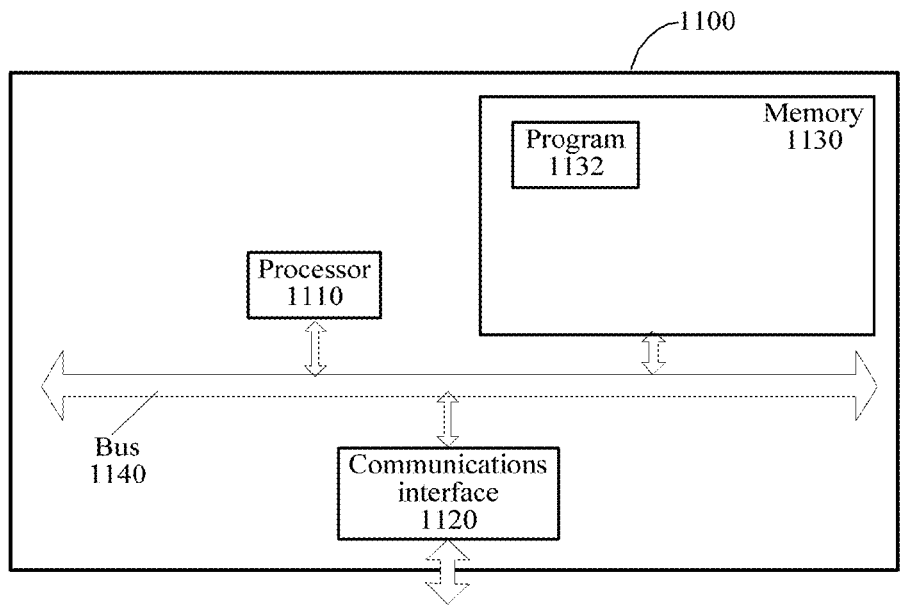
FIG. 11
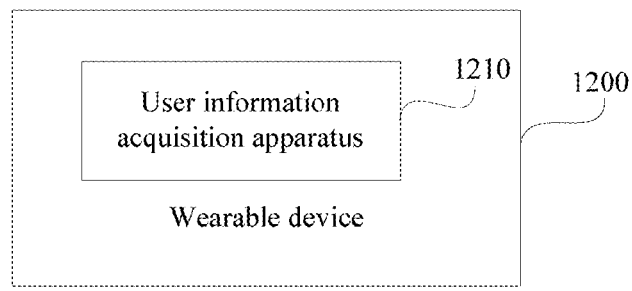
FIG. 12
Embed at least one digital watermark in an image, wherein the digital watermark comprises at least one piece of user related information corresponding to at least one user, and the user related information comprises application startup information used to start a corresponding application    S1310
FIG. 13

US 9,838,588 B2

USER INFORMATION ACQUISITION METHOD AND USER INFORMATION ACQUISITION APPARATUS

CROSS-REFERENCE TO RELATED APPLICATIONS

The present application is a national stage application of International Application No. PCT/CN2014/071141, filed on Jan. 22, 2014, which claims priority to and the benefit of Chinese Patent Application No. 201310572154.3, filed with the State Intellectual Property Office of P.R. China on Nov. 15, 2013, and entitled "USER INFORMATION ACQUISITION METHOD AND USER INFORMATION ACQUISITION APPARATUS". The contents of both of the above-referenced applications are herein incorporated by reference in their entirety.

TECHNICAL FIELD

The present application relates to information acquisition technologies, and in particular, to a user information acquisition method and apparatus.

BACKGROUND

In order to save energy and avoid misoperations, electronic devices are generally set with a screen locking function. Therefore, in an actual operation, a user usually needs to unlock a screen first, and then start a corresponding application program to complete a function required by the user.

U.S. Pat. No. 8,136,053 discloses a method for automatically starting a specific operation by using a special screen unlocking gesture, for example, starting different application programs. In this method, although different applications may be started by using different gestures, it is difficult to remember the gestures and users who perform operations cannot be differentiated, which is insecure.

In addition, when the electronic devices need to be used by different users, different user environments may be set, and an often-used method is that the users log in to the different user environments by using different user names and passwords, which, however, is also not convenient enough and secure enough.

Therefore, a method that is more convenient and secure is needed to help the user start an application in a user environment rapidly.

SUMMARY

An objective of the present application is to provide a user information acquisition solution, so as to obtain user related information, which can further help a user rapidly, conveniently, and securely start a related application.

To achieve the foregoing objective, according to a first aspect, the present application provides a user information acquisition method, comprising:

acquiring an image comprising at least one digital watermark;

acquiring user related information corresponding to a current user and comprised in the at least one digital watermark, wherein the user related information comprises application startup information used to start a corresponding application; and projecting the user related information to a fundus of the user.

According to a second aspect, the present application provides a user information acquisition apparatus, comprising:

an image acquisition module, configured to acquire an image comprising at least one digital watermark;

an information acquisition module, configured to acquire user related information corresponding to a current user and comprised in the at least one digital watermark, wherein the user related information comprises application startup information used to start a corresponding application; and a projection module, configured to project the user related information to a fundus of the user.

According to a third aspect, the present application provides a wearable device, comprising the foregoing user information acquisition apparatus.

In the foregoing at least one technical solution of embodiments of the present application, user related information, corresponding to a current user, in an image comprising a digital watermark is extracted, to enable the user to confidentially obtain application startup information for rapidly starting an application, so as to further start the application rapidly, securely, and conveniently.

BRIEF DESCRIPTION OF THE DRAWINGS

FIG. 11 is a schematic structural diagram of yet another user information acquisition apparatus according to an embodiment of the present application;

FIG. 12 is a schematic block diagram of a structure of a wearable device according to an embodiment of the present application;

FIG. 13 is a flowchart of steps of a user information interaction method according to an embodiment of the present application;

DETAILED DESCRIPTION

The methods and apparatus according to the present application are described in detail with reference to accompanying drawings and embodiments in the following:

Generally, to start an application in a user environment, a user needs to enter the user environment first. As a result, it is inconvenient to start some applications that need to be used by the user frequently.

Digital watermark technologies are to embed some identifier information in a digital carrier to perform copyright protection, anti-counterfeiting, authentication, information hiding, or the like. Generally, a certain device is required to perform reading and verification by using a specific algorithm, and sometimes, a third party authority is also required to participate in an authentication process. These complex processes limit the application of them to some extent. As wearable devices especially smart glasses come into being, a user can be reminded of seen digital watermark information in a manner of visual presentation in the smart glasses. A password, a pattern, an action, or the like that is used by the user to unlock a screen may be used as a digital watermark to be embedded in a lock screen background image, and a specific user can see hidden watermark content by wearing authenticated smart glasses, to indirectly complete a user authentication process of other devices of the user. Therefore, the embodiments of the present application provide the following technical solutions to help the user rapidly and securely start a needed application.

In the following description of the embodiments of the present application, the "user environment" is a service environment related to the user. For example, after logging in through a user login interface of an electronic terminal, such as a mobile phone or a computer, the user enters a service environment of a system of the electronic terminal, wherein the service environment of the system of the electronic terminal generally comprises multiple applications, for example, after entering a service environment of a system of a mobile phone through a lock screen of the mobile phone, the user can start applications corresponding to function modules in the system, such as phone, email, messages, or camera. Alternatively, the user environment may further be a service environment of a certain application which the user enters after logging in through a login interface of the application. The service environment of the application may further comprise multiple lower-level applications. For example, after being started, the phone application in the system of the foregoing mobile phone, may further comprise calling, contacts, call log, or another lower-level application.

Figure 1:
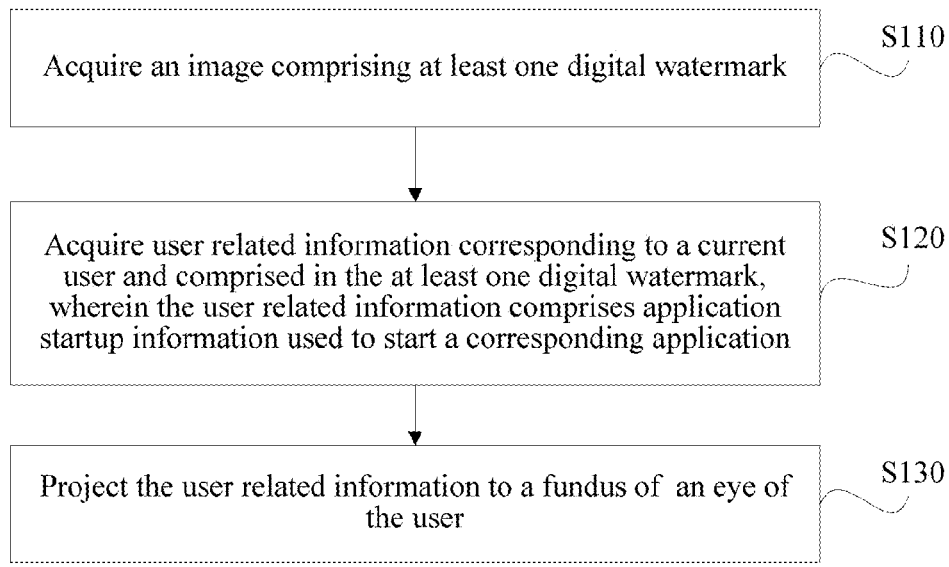
FIG. 1 is a flowchart of steps of a user information acquisition method according to an embodiment of the present application.

As shown in FIG. 1, an embodiment of the present application provides a user information acquisition method, comprising:

S110: Acquire an image comprising at least one digital watermark.

S120: Acquire user related information corresponding to a current user and comprised in the at least one digital watermark, wherein the user related information comprises application startup information used to start a corresponding application.

S130: Project the user related information to a fundus of the user.

In the method according to one embodiment of the present application, user related information, corresponding to a current user, in an image comprising a digital watermark is extracted, to enable the user to confidentially obtain application startup information for rapidly starting an application, to further start the application rapidly, securely, and conveniently.

In the following, the embodiment of the present application further describes the steps by using the following implementation manner:

S110: Acquire an image comprising at least one digital watermark.

There are various manners for acquiring the image in the embodiment of the present invention, for example:

1. Acquire the image by means of shooting.

In the embodiment of the present application, a smart glasses device may be used to shoot an object seen by the user. For example, when the user sees the image, the smart glasses device shoots the image.

2. Acquire the image by means of receiving from an external device.

In a possible implementation manner of the embodiment of the present application, the image may further be acquired by using other devices, and the image is acquired through interaction between devices, or the image is acquired through interaction with a device displaying the image.

S120: Acquire user related information corresponding to a current user and comprised in the at least one digital watermark.

In the embodiments of the present application, there are various methods for acquiring the user related information, for example, one or more of the following:

1. Extract the user related information from the image.

In this implementation manner, for example, the digital watermark in the image may be analyzed by using a personal private key and a public or private watermark extraction method, to extract the user related information.

2. Send the image to an external device, and receive the user related information in the image from the external device.

In this implementation manner, the image may be sent to an external device, for example, sent to a cloud server or a third party authority to extract the user related information in the digital watermark in the image.

Figure 2:
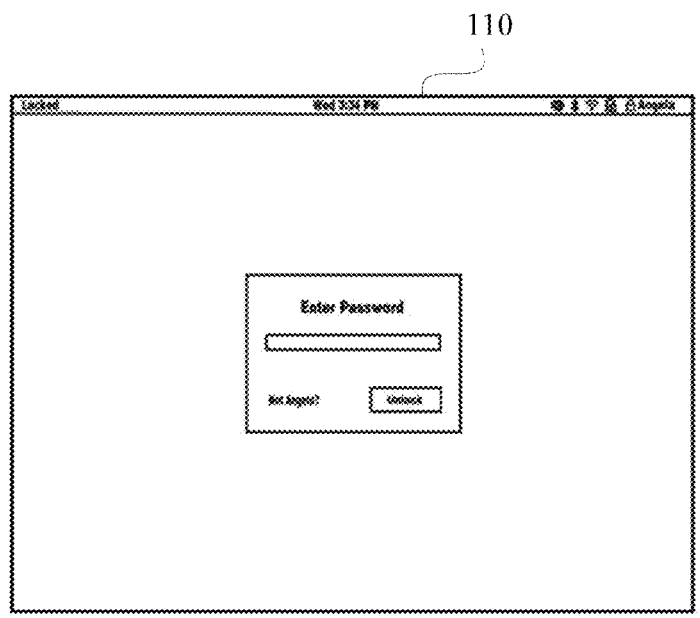
FIG. 2 and FIG. 3 are schematic application diagrams of a user information acquisition method according to an embodiment of the present application.

As shown in FIG. 2, in a possible implementation manner of one embodiment of the present application, the image is a login interface 110 of a user environment displayed by a device.

The application startup information is used to directly start, on the login interface, the corresponding application in the user environment corresponding to the current user.

In the prior art, on a lock screen of some electronic devices that do not need user authentication, for example, there are interfaces for rapidly starting some applications, which is very convenient, but is not secure. In the embodiments of the present invention, the user can confidentially obtain, on a login interface of a user environment, application startup information used to directly start the corresponding application in the user environment on the login interface, to enable the user to start a required application rapidly, conveniently and securely, thereby improving user experience.

In a possible implementation manner, in addition to the foregoing application startup information, the user related information can further comprise: user authentication information for the current user to log in to the user environment.

Figure 3:
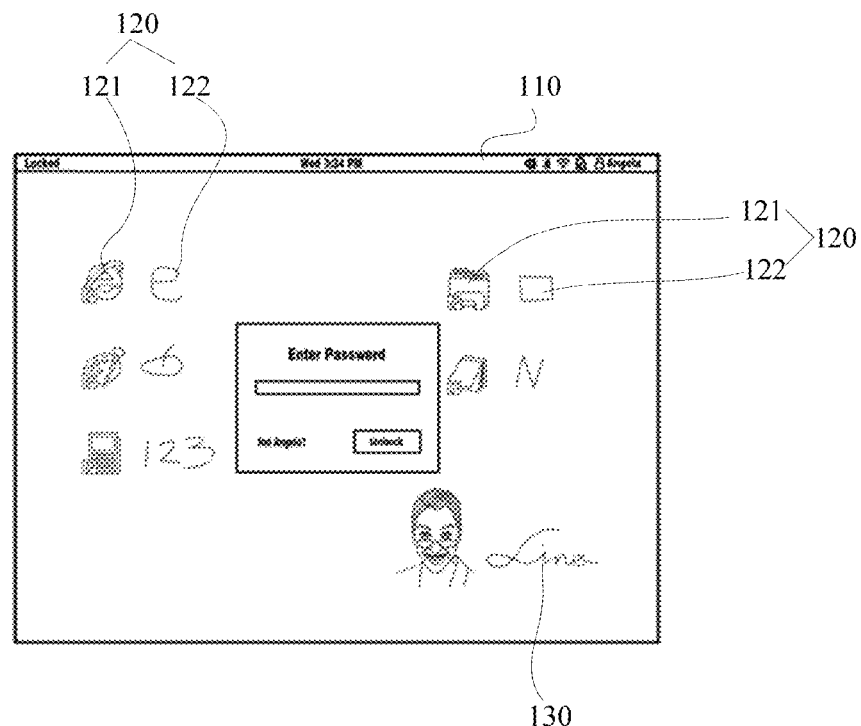

Herein, the user authentication information may be, for example, information for the user to log in to the user environment, such as a user name, a password, or a gesture. The user can enter a corresponding user environment by inputting the user authentication information. For example, the user inputs, on a lock screen of a mobile phone, a password set by the user, or a specific finger moving track, or the like to unlock the screen, and enters a user environment of a mobile phone system. As shown in FIG. 3, the user can enter the user environment by inputting, on the screen, user authentication information 130 shown in FIG. 3 (for example, enter a user environment corresponding to the user by inputting a track of a graph "lina" shown in FIG. 3) instead of directly starting an application.

In some possible implementation manners of the embodiments of the present application, before the acquiring user related information corresponding to a current user and comprised in the at least one digital watermark, the method further comprises: authenticating the current user. An identity of the current user is confirmed, to cause the user related information corresponding to the user to be obtained in step S120. For example, the user implements the functions of the steps in the embodiment of the present application by using a pair of smart glasses on which identity authentication is successfully performed.

Certainly, in some scenarios in which confidentiality requirements are not high, the authentication may not be performed, and the user can obtain, by using a corresponding device, corresponding information that can be obtained by the device. It is still used as an example that the user implements the functions of the steps in the embodiments of the present application by using a pair of smart glasses. Generally, a specific pair of glasses is only used by a specific user. Therefore, in this implementation manner, user related information corresponding to a pair of smart glasses may be obtained by using the pair of smart glasses, and no particular identity confirmation needs to be performed on the user.

S130: Project the user related information to a fundus of the user.

In one embodiment of the present application, in order to enable the user to obtain the user related information in a confidential scenario, the user related information is projected to the fundus of the user, to enable the user to obtain the corresponding user related information.

In a possible implementation manner, the projection may be that the user related information is directly projected to the fundus of the user by using a projection module.

In another possible implementation manner, the projection may also be that the user related information is displayed in a location that only the user can see (for example, a display surface of a pair of smart glasses), and the user related information is projected to the fundus of the user through the display surface.

In the first manner, the user related information does not need to pass through an intermediate display, but directly reaches the fundus of the user, and therefore, the first manner has higher privacy. The following further describes this implementation manner. Step S130 comprises:

projecting the user related information; and adjusting at least one projection imaging parameter of an optical path between a projection location of the user related information and an eye of the user until the image of the user related information formed at the fundus of the user satisfies at least one defined first clarity criterion, wherein the clarity criterion may be defined according to a clarity measurement parameter commonly used by a person skilled in the art, such as effective resolution of an image.

In a possible implementation manner of the embodiments of the present application, the step of adjusting the parameter comprises:

adjusting at least one imaging parameter of at least one optical device on the optical path between the projection location and the eye of the user, and/or a location of the at least one optical device on the optical path.

The at least one imaging parameter herein comprises a focal length, an optical axis direction, and the like of the at least one optical device. The adjustment causes the user related information to be properly projected to the fundus of the user, for example, by adjusting the focal length of the at least one optical device, an image of the user related information can be clearly formed at the fundus of the user. "Clearly" herein refers to that the at least one defined first clarity criterion is satisfied. Alternatively, in the following mentioned implementation manner, when three-dimensional display is required, in addition to directly generating an image of the left eye and an image of the right eye that are with parallax, by separately projecting same user related information to the two eyes with certain deviation, an effect of three-dimensional display of the user related information may also be achieved. At this time, for example, the effect may be achieved by adjusting an optical axis parameter of the optical device.

When the user sees the user related information, a direction of a sight line of an eye may change, and it is required that the user related information be well projected to the fundus of the user at the time of a different direction of the sight line of the eye. Therefore, in a possible implementation manner of the embodiments of the present application, step S130 further comprises:

transferring, corresponding to locations of a pupil when optical axis directions of the eye are different, the user related information to the fundus of the user.

In a possible implementation manner of one embodiment of the present application, a curved optical device, such as a curved beam splitter may be required to implement the function of the foregoing step. However, to-be-displayed content is generally deformed after passing through the curved optional device. Therefore, in a possible implementation manner of one embodiment of the present application, step S130 further comprises:

performing, on the user related information, counter-deformation processing corresponding to locations of a pupil when the optical axis directions of the eye are different, to cause the fundus to receive the user related information that needs to be presented.

For example, the projected user related information is preprocessed to enable the projected user related information to have a counter-deformation effect that is opposite to the deformation, and then after the user related information passes through the foregoing curved optical device, the counter-deformation effect is offset by a deformation effect of the curved optical device, and therefore, the user related information received at the fundus of the user is presented in a required effect.

In a possible implementation manner, user related information projected to the eye of the user does not need to be aligned with the image. For example, when the user needs to input, in a certain sequence in an input box displayed in the image, a group of application startup information or user authentication information, such as "1234", the group of information only needs to be projected to the fundus of the user to be seen by the user. However, in some cases, for example, when the user related information is a specific action needs to be completed at a specific location, for example, a specific track needs to be drawn at a specific location on a screen on which the image is displayed, the user related information and the image need to be displayed in an aligned manner. Therefore, in a possible implementation manner of one embodiment of the present application, step S130 comprises:

aligning, at the fundus of the user, the projected user related information with an image seen by the user.

As shown in FIG. 3, in this implementation manner, the user acquires six pieces of user related information through step S120, comprising five pieces of application startup information 120 and one piece of user authentication information 130.

As can be seen from FIG. 3, in this implementation manner, an application startup information 120 seen by the user through step S130 comprises identifier information 121 (which may be the graph shown in FIG. 3, or may be other words or symbols, or the like; certainly, in some implementation manners, the identifier information 121 may be directly displayed in the image) used to identify an application and input information 122 (which may be a graphic track shown in FIG. 3, or may be numbers, or symbols, or the like) for starting the application. Certainly, in another implementation manner of the embodiment of the present application, the application startup information may only comprise the input information. An application startup information 120 at the upper left corner of the login interface 110 shown in FIG. 3 is used as an example, wherein the application startup information 120 comprises the identifier information 121 of a browser application at the left, and an "e"-shaped graphic track at the right. For example, the user may directly start the browser application by drawing an "e"-shaped track on the screen.

In some embodiments, in order to prevent a misoperation by the user and to improve input confidentiality, a specific graphic track, for example, the "e"-shaped track shown in FIG. 3, needs to be input at a specific location, for example, the location on the screen on which the "e"-shaped track is located shown in FIG. 3, to start a corresponding application. In this case, projected user related information needs to be aligned with the image, to enable the user to see the user related information at a required location.

To implement the foregoing alignment function, in a possible implementation manner, the method further comprises:

detecting a location, of a gaze point of the user, relative to the user, wherein the aligning, at the fundus of the user, the projected user related information with an image seen by the user comprises: aligning, at the fundus of the user according to the location, the projected user related information with the image seen by the user.

Herein, because the user is viewing the image at this moment, for example, a lock screen interface of a mobile phone of the user, the location corresponding to the gaze point of the user is the location at which the image is located.

In this implementation manner, there are various manners for detecting the location of the gaze point of the user, which, for example, comprise one or more of the following:

1) Use a pupil direction detector to detect an optical axis direction of an eye, and use a depth sensor (such as an infrared distance meter) to obtain a depth of an eye-gazed scenario, and obtain a location of a gaze point of a sight line of the eye. The technology belongs to the prior art, and is not described again in this implementation manner.

2) Separately detect optical axis directions of two eyes, obtain directions of sight lines of the two eyes of the user according to the optical axis directions of the two eyes, and obtain the location of the gaze point of the sight lines of the eyes by using an intersection point of the directions of the sight lines of the two eyes. The technology also belongs to the prior art, and is not described herein again.

3) Obtain the location of the gaze point of the sight line of the eye according to optical parameters of an optical path between an image acquisition location and the eye and optical parameters of the eye at the time when a fundus image that satisfies at least one defined second clarity criterion and is presented on an imaging surface of an eye is acquired. One embodiment of the present application provides a specific process of the method in the following, which is not described herein again.

Certainly, a person skilled in the art may understand that in addition to the foregoing several forms of gaze point detection methods, other methods that may be used to detect a gaze point of an eye of the user may also be used in the method according to the embodiments of the present application.

Steps of detecting a location of a current gaze point of the user by using method 3) comprise:

a fundus image acquisition step: acquiring at least one fundus image at the fundus of an eye of the user;

an adjustable imaging step: adjusting at least one imaging parameter of an optical path between an image acquisition location of the at least one fundus image and the eye of the user until a fundus image in the at least one fundus image that satisfies at least one defined second clarity criterion is acquired; and an image processing step: analyzing the at least one fundus image, to obtain imaging parameters of the optical path and optical parameters of the eye corresponding to the fundus image, and acquiring a distance of a current gaze point of the user relative to the user according to the imaging parameters and the optical parameters of the eye.

In the second clarity criterion herein, the clarity criterion is the foregoing clarity criterion commonly used by a person skilled in the art, which may be the same as or may be different from the foregoing first clarity criterion.

By analyzing the at least one fundus image, the optical parameters of the eye at the time when the fundus image is acquired is obtained, and therefore, a position of a current focusing point of a sight line is obtained through calculation, which provides a basis for further detecting an observing behavior of an observer based on the accurate location of the focusing point.

The image presented at "the fundus" herein mainly is an image presented on a retina, which may be an image of the fundus, or an image of another object projected to the fundus, such as a light spot pattern mentioned below.

In the adjustable imaging step, by adjusting a focal length of at least one optical device on the optical path and/or a location of the at least one optical device on the optical path, the fundus image that satisfies the at least one defined second clarity criterion may be obtained when the at least one optical device is at a certain location or in a certain state, wherein the adjustment may be continuous and in real time.

In a possible implementation manner of the embodiment of the present application, an optional device may be a focal length adjustable lens, configured to adjust a refractive index and/or a shape of the optical device to complete adjustment of the focal length of the optical device. Specifically: 1) Adjust the focal length by adjusting curvature of at least one surface of the focal length adjustable lens, for example, adjust the curvature of the focal length adjustable lens by increasing or decreasing liquid media in a cavity formed by two transparent layers; 2) Adjust the focal length by changing the refractive index of the focal length adjustable lens, for example, a specific liquid crystal medium is filled in the focal-length adjustable lens, and arrangement of the liquid crystal medium is adjusted by adjusting a voltage of a corresponding electrode of the liquid crystal medium, and therefore, change the refractive index of the focal length adjustable lens.

In another possible implementation manner of the method according to one embodiment of the present application, an optical device may be a group of lenses, configured to complete adjustment of a focal length of the group of lenses by adjusting relative locations between the lenses in the group of lenses. Alternatively, one or more lenses in the group of lenses are the foregoing focal length adjustable lenses.

In addition to changing the imaging parameters by changing characteristics of the optical device as described above, the imaging parameters may also be changed by adjusting the position of the optical device on the optical path.

In addition, in the method according to the embodiment of the present application, the image processing step further comprises:

analyzing the at least one fundus image, to find the fundus image that satisfies at least one defined second clarity criterion; and calculating optical parameters of the eye according to the fundus image and known imaging parameters in response to the fundus image.

The adjustment in the adjustable imaging step causes the fundus image to be acquired. However, the fundus image needs to be found by using the image processing step. The optical parameters of the eye can be obtained through calculation according to the fundus image and the known imaging parameters of the optical path.

Figure 4A:
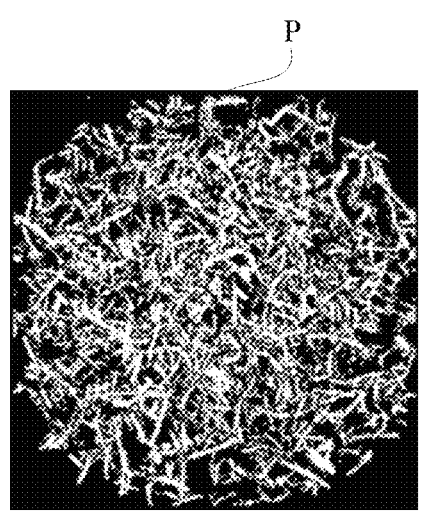
FIG. 4a and FIG. 4b are schematic diagrams of a light spot pattern used in a user information acquisition method according to an embodiment of the present application and an image obtained at a fundus and comprising the light spot pattern.
Figure 4B:
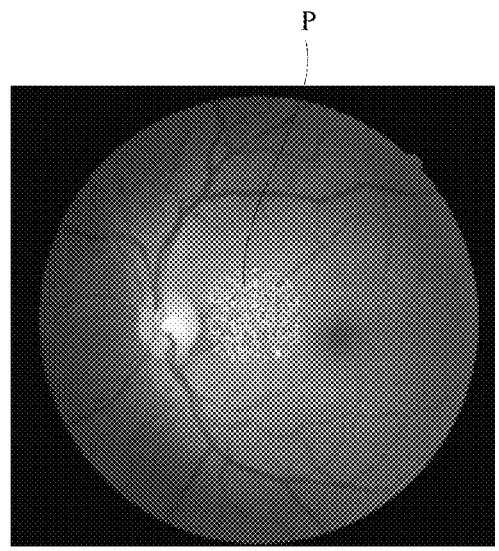

In the method according to one embodiment of the present application, the image processing step may further comprise:

projecting a light spot to the fundus, wherein the projected light spot may have no specific pattern but only be used to illuminate the fundus. The projected light spot may further comprise a pattern with abundant features. The abundant features of the pattern may be for easy detection and improve detection precision. FIG. 4a is a schematic diagram of a light spot pattern P. The pattern may be formed by a light spot pattern generator, such as frosted glass. FIG. 4b shows an image acquired at the fundus when the light spot pattern P is projected.

In order not to affect normal viewing of the eye, the light spot can be an eye-invisible infrared light spot. At this time, in order to decrease interference from other spectrums, lights except the eye-invisible light in the projected light spot may be filtered out.

Correspondingly, the method according to the embodiment of the present application may further comprise the following step:

Control luminance of the projected light spot according to a result obtained through analysis in the foregoing steps. The analysis result comprises, for example, a feature of the at least one fundus image, comprising a contrast of the feature of the at least one fundus image, a texture feature, and the like.

It should be noted that a special case of controlling the luminance of the projected light spot is starting or stopping projection. For example, when an observer keeps gazing at a point, the projection may be stopped periodically; or when a fundus of the observer is bright enough, the projection may be stopped, and information at the fundus can be used to detect a distance from a focusing point of a current sight line of an eye to the eye.

In addition, the luminance of the projected light spot may further be controlled according to ambient light.

In the method according to one embodiment of the present application, the image processing step further comprises:

Calibrating to obtain at least one reference image corresponding to the image presented at the fundus. Comparative calculation is performed on the image presented at the fundus and the reference image, to obtain the fundus image that satisfies the at least one defined second clarity criterion. Herein, the fundus image that satisfies the at least one defined second clarity criterion may be an obtained image that is the least different from the reference image. In the method according to this implementation manner, a difference between the currently obtained image and the reference image may be calculated by using an existing image processing algorithm, for example, by using a classic automatic phase difference focusing algorithm.

The optical parameter of the eye may comprise an optical axis direction of an eye obtained according to a feature of the eye at the time when the fundus image that satisfies the at least one defined second clarity criterion is acquired. The feature of the eye herein may be acquired from the fundus image that satisfies the at least one defined second clarity criterion, or may be acquired in another manner. A direction of a sight line at which an eye of the user gazes may be obtained according to the optical axis direction of the eye. Specifically, the optical axis direction of the eye may be obtained according to the feature of the fundus at the time when the fundus image that satisfies the at least one defined second clarity criterion is obtained, and determining the optical axis direction of the eye by using the feature of the fundus has higher precision.

When a light spot pattern is projected to the fundus, a size of the light spot pattern may be bigger than a fundus visible region or may be smaller than the fundus visible region.

When an area of the light spot pattern is smaller than or equal to the fundus visible region, a classic feature points matching algorithm (for example, the scale invariant feature transform (SIFT) algorithm) may be used to determine the optical axis direction of the eye by detecting a location, of the light spot pattern in the image, relative to the fundus.

When the area of the light spot pattern is bigger than or equal to the fundus visible region, a location, of the light spot pattern in the obtained image, relative to an original light spot pattern (obtained through image calibration) may be used to determine the optical axis direction or to determine a direction of a sight line of the observer.

In another possible implementation manner of the method according to the embodiment of the present application, the optical axis direction of the eye may further be obtained according to a feature of an eye pupil at the time when the fundus image that satisfies the at least one defined second clarity criterion is obtained. The feature of the eye pupil herein may be acquired from the fundus image that satisfies the at least one defined second clarity criterion, or may be acquired in another manner. The obtaining the optical axis direction of the eye by using the feature of the eye pupil belongs to the prior art, and is not described herein again.

In addition, the method according to the embodiment of the present application may further comprise steps of calibrating the optical axis direction of the eye, so as to more precisely determine the foregoing optical axis direction of the eye.

In the method according to the embodiment of the present application, the known imaging parameters comprises at least one fixed imaging parameter and at least one real-time imaging parameter, wherein the at least one real-time imaging parameter is parameter information of the optical device at the time when the fundus image that satisfies the at least one defined second clarity criterion is acquired, and the parameter information may be obtained in a manner of real-time recording at the time when the fundus image that satisfies the at least one defined second clarity criterion is acquired.

After a current optical parameter of the eye is obtained, a location of a gaze point of the eye may be obtained with reference to a distance from a focusing point of the eye to the eye, which is obtained through calculation (a specific process is to be described in detail in combination with the apparatus part).

In order to make the user related information seen by the user have a three-dimensional display effect and look more real, in a possible implementation manner of the embodiment of the present application, the user related information may be projected to the fundus of the user three-dimensionally in step 130.

As described above, in a possible implementation manner, the three-dimensional display may be that projection location adjustment in step S130 is performed on same information to cause information with parallax that is seen by two eyes of the user to form a three-dimensional display effect.

In another possible implementation manner, the user related information comprises three-dimensional information separately corresponding to the two eyes of the user, and in step S130, corresponding user related information is separately projected to the two eyes of the user. That is: the user related information comprises left eye information corresponding to the left eye of the user and right eye information corresponding to the right eye of the user, and during projection, the left eye information is projected to the left eye of the user and the right eye information is projected to the right eye of the user, to cause the user related information seen by the user to have a proper three-dimensional display effect, and bring better user experience. In addition, when the user related information input by the user comprises three-dimensional space information, the foregoing three-dimensional projection causes the user to see the three-dimensional space information. For example, when a user needs to make a specific gesture at a specific location in the three-dimensional space to correctly input the user related information, the foregoing method according to one embodiment of the present application causes the user to see three-dimensional user related information, and know the specific location and the specific gesture according to the user related information, and further causes the user to make the gesture, at the specific location, prompted by the user related information. At this time, even if another person sees the gesture action made by the user, the person cannot know the space information, which causes the user related information to have a better confidentiality effect.

Figure 5:
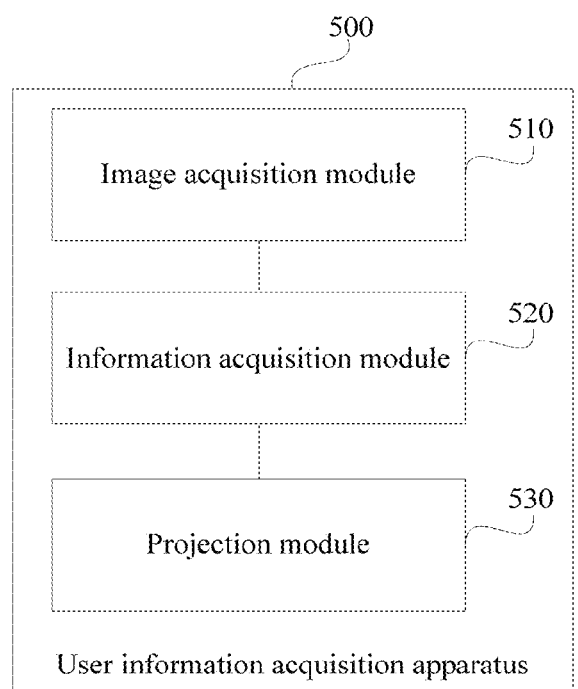
FIG. 5 is a schematic block diagram of a structure of a user information acquisition apparatus according to an embodiment of the present application.

As shown in FIG. 5, an embodiment of the present application further provides a user information acquisition apparatus 500, comprising:

an image acquisition module 510, configured to acquire an image comprising at least one digital watermark;

an information acquisition module 520, configured to acquire user related information corresponding to a current user and comprised in the at least one digital watermark, wherein the user related information comprises application startup information used to start a corresponding application; and a projection module 530, configured to project the user related information to a fundus of the user.

In the method according to the embodiment of the present application, user related information, corresponding to a current user, in an image comprising a digital watermark is extracted, to enable the user to confidentially obtain application startup information for rapidly starting an application, so as to further start the application rapidly, securely, and conveniently.

In order to enable the user acquire the user related information more naturally and conveniently, the apparatus according to the embodiment of the present application is a wearable device that is used near eyes of the user, such as a pair of smart glasses. When a gaze point of a sight line of the user falls on the image, the image is automatically acquired by using the image acquisition module 510, and after the user related information is obtained, the user related information is projected to the fundus of the user.

Figure 6A:
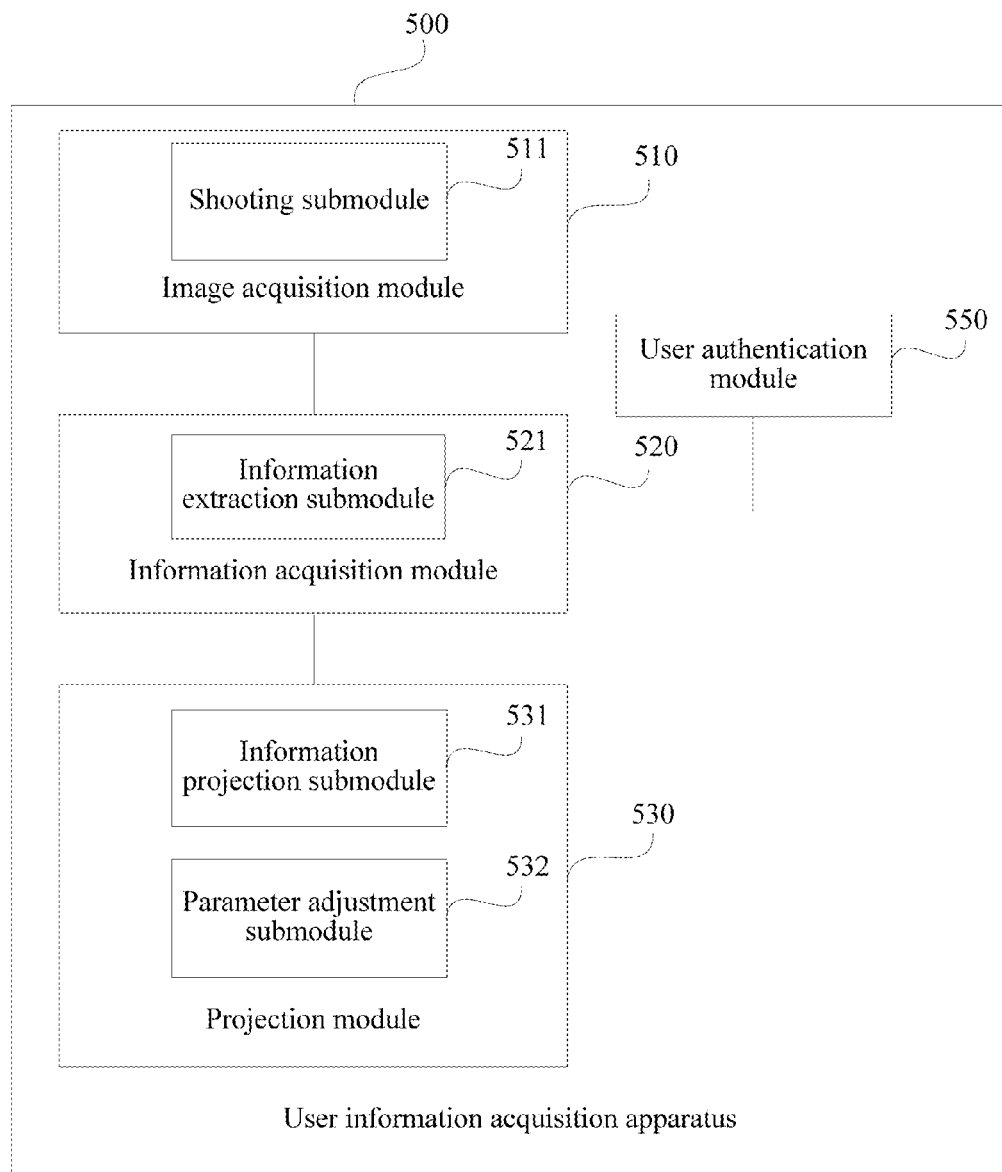
FIG. 6a and FIG. 6b are schematic block diagrams of structures of another two user information acquisition apparatuses according to an embodiment of the present application.

In the following, one embodiment of the present application further describes the modules of the foregoing apparatus by using the following implementation manners:

In an implementation manner of the embodiment of the present application, the image acquisition module 510 may have various forms. For example:

As shown in FIG. 6a, the image acquisition module 510 comprises a shooting submodule 511, configured to shoot the image.

The shooting submodule 511 can be, for example, a camera of a pair of smart glasses, configured to shoot an image seen by the user.

Figure 6B:
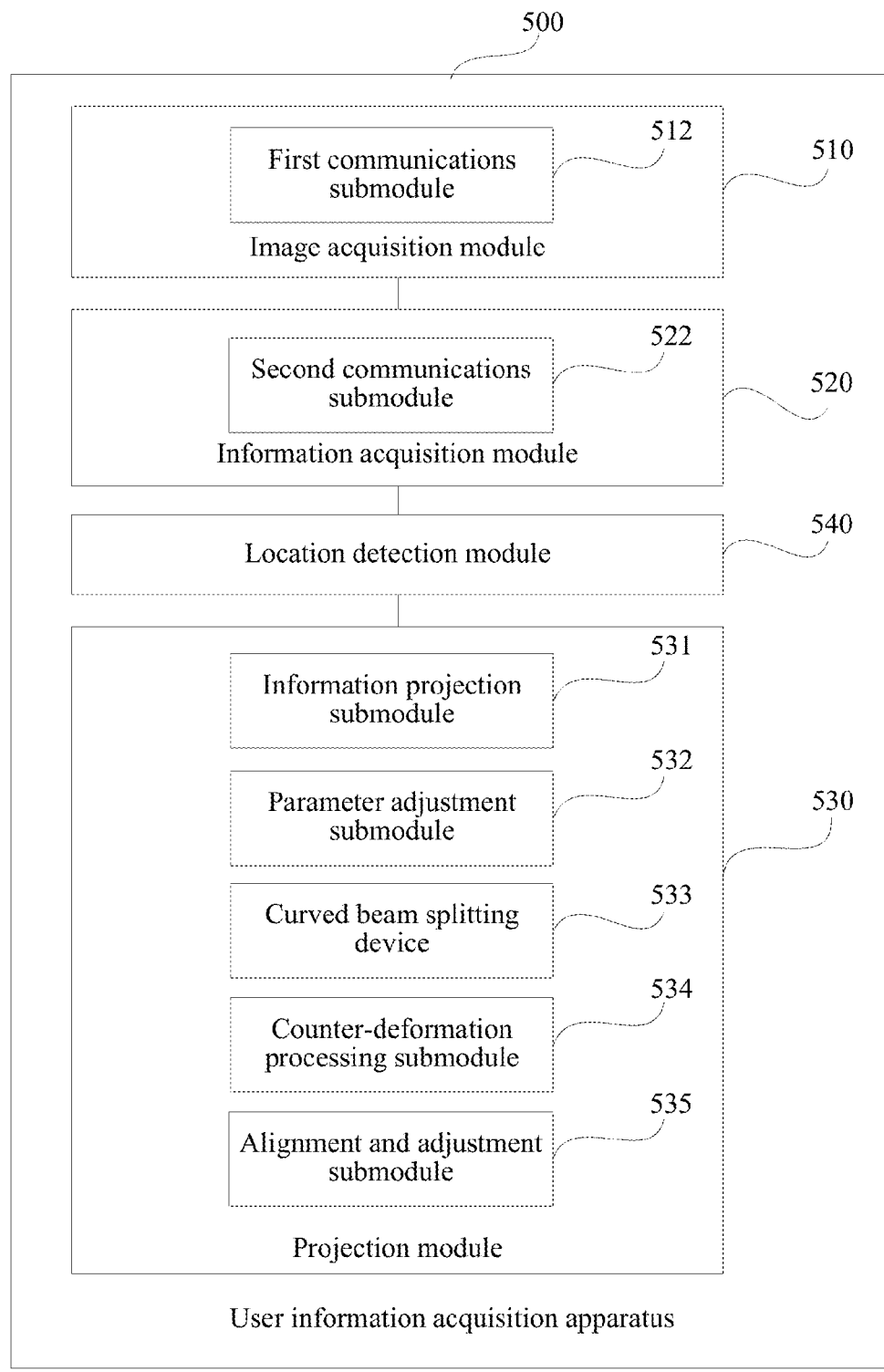

As shown in FIG. 6b, in another implementation manner of the embodiment of the present application, the image acquisition module 510 comprises:

a first communications submodule 512, configured to receive the image from an external device.

In this implementation manner, the image may be acquired by another device, and then the image is sent to the apparatus according to the embodiment of the present application; or the image is acquired through interaction with a device displaying the image (that is, the device transfers displayed image information to the apparatus according to the embodiment of the present application).

In the embodiment of the present application, the information acquisition module 520 may also have various forms. For example:

As shown in FIG. 6a, the information acquisition module 520 comprises: an information extraction submodule 521, configured to extract the user related information from the image.

In this implementation manner, the information extraction submodule 521 may, for example, analyze the digital watermark in the image by using a personal private key and a public or private watermark extraction method, to extract the user related information.

As shown in FIG. 6b, in another implementation manner of one embodiment of the present application, the information acquisition module 520 comprises: a second communications submodule 522, configured to:

send the image to an external device, and receive the user related information in the image from the external device.

In this implementation manner, the image may be sent to an external device, for example, sent to a cloud server or a third party authority, to extract the user related information in the digital watermark in the image by using the cloud server or the third party authority, and then the user related information is sent back to the second communications submodule 522 in one embodiment of the present application.

Herein, functions of the first communications submodule 512 and the second communications submodule 522 may be implemented by a same communications module.

As shown in FIG. 6a, in a possible implementation manner of one embodiment of the present invention, in a case in which a user of the apparatus needs to be authenticated, the apparatus 500 further comprises: a user authentication module 550, configured to authenticate a current user.

The user authentication module may be an existing user authentication module, for example, an authentication module that performs authentication by using biological features of the user, such as a pupil, or a fingerprint; or a module that performs authentication by using an instruction input by the user. These authentication modules all belong to the prior art, and are not described herein again.

A pair of smart glasses is used as an example again. When the user uses the pair of smart glasses that can implement the function of the apparatus according to the embodiment of the present application, the pair of smart glasses first authenticates the user, to cause the pair of smart glasses to know an identity of the user, and subsequently, when extracting the user related information by using the information extraction module 520, the pair of smart glasses only acquires the user related information corresponding to the user. That is, as long as the user goes through user authentication with the pair of smart glasses of the user once, the user related information can be acquired from devices of the user or public devices by using the pair of smart glasses.

Certainly, a person skilled in the art may know that when no authentication needs to be performed on the user, as shown in FIG. 6b, the apparatus may not comprise the user authentication module.

As shown in FIG. 6a, in this implementation manner, the projection module 530 comprises:

an information projection submodule 531, configured to project the user related information; and a parameter adjustment submodule 532, configured to adjust at least one projection imaging parameter of an optical path between the information projection submodule 531 and an eye of the user until the image of the user related information formed at the fundus of the user satisfies at least one defined first clarity criterion.

In an implementation manner, the parameter adjustment submodule 532 comprises:

at least one adjustable lens device, a focal length of the at least one adjustable lens device being adjustable and/or a location of the at least one adjustable lens device on the optical path being adjustable.

As shown in FIG. 6b, in an implementation manner, the projection module 530 comprises:

a curved beam splitting device 533, configured to transfer, corresponding to locations of a pupil when the optical axis directions of the eye are different, the user related information to the fundus of the user.

In an implementation manner, the projection module 530 comprises:

a counter-deformation processing submodule 534, configured to perform, on the user related information, counter-deformation processing corresponding to locations of a pupil at the time when the optical axis directions of the eye are different, to cause the fundus to receive the user related information that needs to be presented.

In an implementation manner, the projection module 530 comprises:

an alignment and adjustment submodule 535, configured to align, at the fundus of the user, the projected user related information with an image seen by the user.

In an implementation manner, the apparatus further comprises:

a location detection module 540, configured to detect a location, of a gaze point of the user, relative to the user, wherein the alignment and adjustment submodule 535 is configured to align, at the fundus of the user according to the location, the projected user related information with the image seen by the user.

For functions of the submodules of the foregoing projection module 530, refer to the description of corresponding steps in the foregoing method embodiment, and examples are provided in embodiments shown in FIG. 7a to FIG. 7d, FIG. 8, and FIG. 9 below.

In one embodiment of the present application, the location detection module 540 may have various implementation manners, for example, an apparatus corresponding to the methods 1) to 3) described in the method embodiment. One embodiment of the present application further describes a location detection module corresponding to method 3) by using implementation manners corresponding to FIG. 7a to FIG. 7d, FIG. 8, and FIG. 9.

Figure 7A:
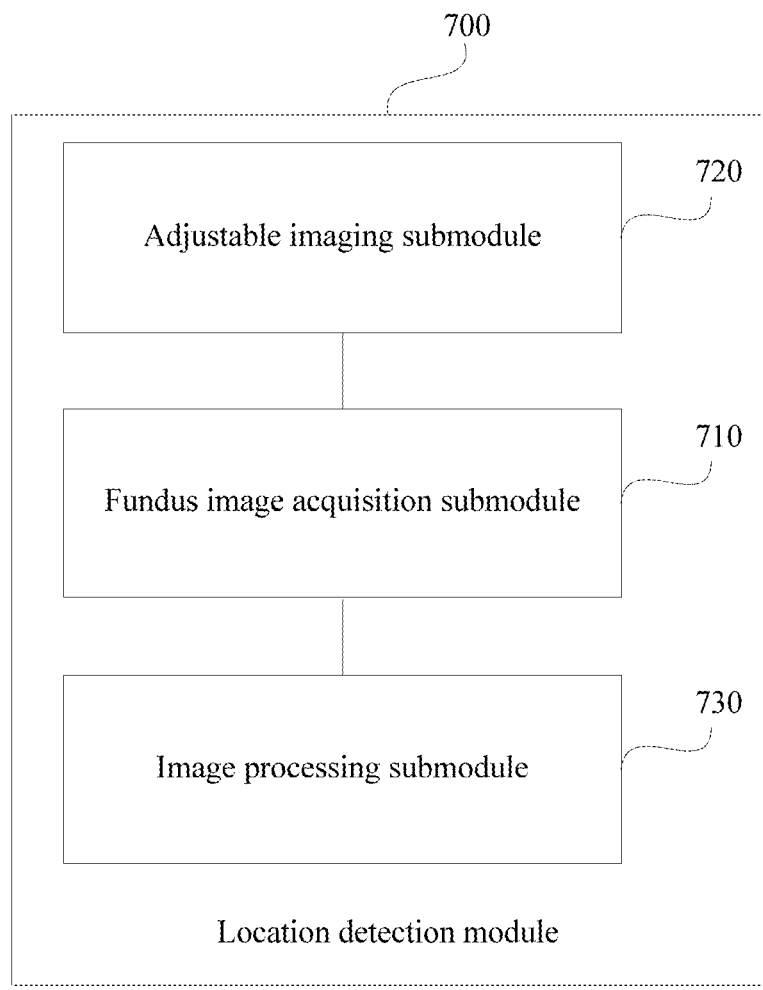
FIG. 7a is a schematic block diagram of a structure of a location detection module used in a user information acquisition apparatus according to an embodiment of the present application.

As shown in FIG. 7a, in a possible implementation manner of one embodiment of the present application, the location detection module 700 comprises:

a fundus image acquisition submodule 710, configured to acquire at least one fundus image at the fundus of the eye of the user;

an adjustable imaging submodule 720, configured to adjust at least one imaging parameter of an optical path between the fundus image acquisition submodule 710 and the eye of the user until a fundus image that satisfies at least one defined second clarity criterion is acquired; and an image processing submodule 730, configured to analyze the at least one image, to obtain imaging parameters of the optical path and optical parameters of the eye corresponding to the fundus image, and acquiring a distance of a current gaze point of the user relative to the user according to the imaging parameters and the optical parameters of the eye.

The location detection module 700 analyzes the at least one fundus image, to obtain an optical parameter of the eye at the time when the fundus image acquisition submodule obtains the fundus image, and therefore, the location of the current gaze point of the eye can be obtained through calculation.

The image presented at "the fundus" herein mainly is an image presented on a retina, which may be an image of the fundus, or an image of another object projected to the fundus. The eye herein may be a human eye, or may be an eye of another animal.

Figure 7B:
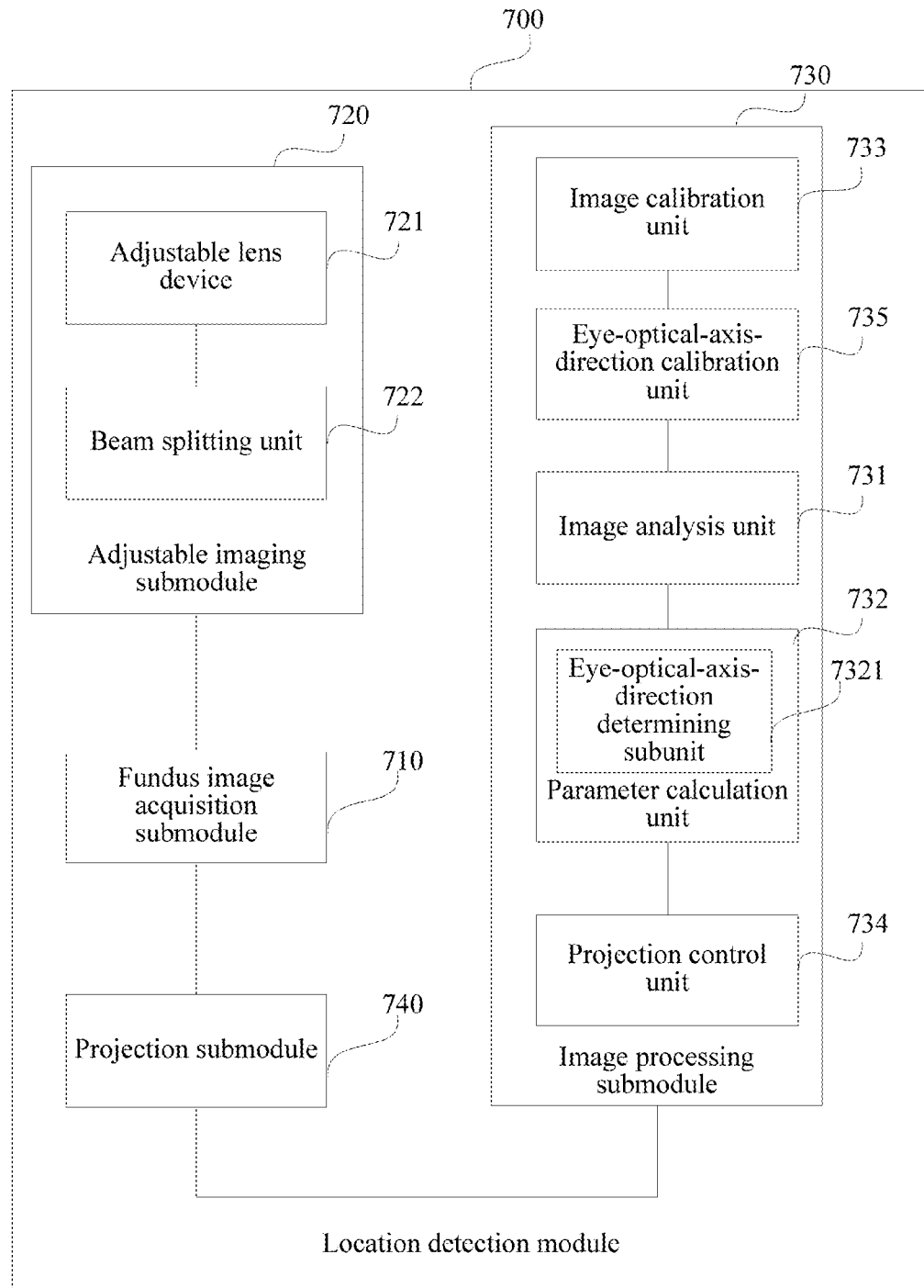
FIG. 7b is a schematic block diagram of a structure of a location detection module used in another user information acquisition apparatus according to an embodiment of the present application.

As shown in FIG. 7b, in a possible implementation manner of one embodiment of the present application, the fundus image acquisition submodule 710 is a micro camera, and in another possible implementation manner of the embodiment of the present application, the fundus image acquisition submodule 710 may further use a light sensitive imaging device directly, such as a CCD, or a CMOS.

In a possible implementation manner of one embodiment of the present application, the adjustable imaging submodule 720 comprises: an adjustable lens device 721, located at an optical path between the eye and the fundus image acquisition submodule 710, wherein a focal length of the adjustable lens device 721 is adjustable and/or a location of the adjustable lens device 721 on the optical path is adjustable. The adjustable lens device 721 causes a system equivalent focal length from the eye to the fundus image acquisition submodule 710 to be adjustable, and adjustment of the adjustable lens device 721 causes the fundus image acquisition submodule 710 to obtain, in a certain location or state of the adjustable lens device 721, a fundus image that satisfies at least one defined second clarity criterion at the fundus. In this implementation manner, the adjustable lens device 721 is adjusted continuously in real time during detection.

In a possible implementation manner of one embodiment of the present application, the adjustable lens device 721 is a focal length adjustable lens, configured to adjust a refractive index and/or a shape of the adjustable lens device 721, to complete adjustment of the focal length of the adjustable lens device 721. Specifically: 1) Adjust the focal length by adjusting curvature of at least one surface of the focal length adjustable lens, for example, adjust the curvature of the focal length adjustable lens by increasing or decreasing liquid media in a cavity formed by two transparent layers; 2) Adjust the focal length by changing the refractive index of the focal length adjustable lens, for example, a specific liquid crystal medium is filled in the focal-length adjustable lens, and arrangement of the liquid crystal medium is adjusted by adjusting a voltage of a corresponding electrode of the liquid crystal medium, and therefore, change the refractive index of the focal length adjustable lens.

In another possible implementation manner of the embodiment of the present application, the adjustable lens device 721 comprises: a group of lenses, formed by multiple pieces of lenses, and configured to adjust relative locations between the lenses in the group of lenses to complete adjustment of a focal length of the group of lenses. The group of lenses may also comprise a lens with an imaging parameter, such as a focal length, of the lens being adjustable.

In addition to the foregoing two manners for changing imaging parameters of the location detection module 700 by adjusting features of the adjustable lens device 721, the imaging parameters may also be changed by adjusting the location of the adjustable lens device 721 on the optical path.

In a possible implementation manner of an embodiment of the present application, in order not to affect the experience of the user for viewing an observed object, and in order to cause the system to be applied to the wearable device in a portable manner, the adjustable imaging submodule 720 further comprises: a beam splitting unit 722, configured to form a light transfer path between the eye and the observed object, and between the eye and the fundus image acquisition submodule 710. This may fold the optical path, decrease a size of the system, and affect other visual experience of the user as little as possible.

In this implementation manner, the beam splitting unit comprises a first beam splitting unit, located between the eye and the observed object, and configured to transmit light from the observed object to the eye, and transfer light from the eye to the fundus image acquisition submodule.

The first beam splitting unit may be a beam splitter, a beam splitting optical waveguide (comprising an optical fiber), or another suitable beam splitting device.

In a possible implementation manner of an embodiment of the present application, the image processing submodule 730 comprises an optical path calibration unit, configured to calibrate an optical path of the location detection module 700, for example, perform alignment and calibration on an optical axis of the optical path, to ensure precision of measurement.

In a possible implementation manner of an embodiment of the present application, the image processing submodule 730 comprises:

an image analysis unit 731, configured to analyze the at least one image obtained by the fundus image acquisition submodule, to find the fundus image that satisfies at least one defined second clarity criterion; and a parameter calculation unit 732, configured to calculate optical parameters of the eye according to the fundus image and known imaging parameters of the location detection module 700 in response to the fundus image.

In this implementation manner, the adjustable imaging submodule 720 causes the fundus image acquisition submodule 710 to obtain the fundus image that satisfies at least one defined second clarity criterion. However, the fundus image that satisfies the at least one defined second clarity criterion needs to be found by using the image analysis unit 731. In this way, the optical parameters of the eye can be obtained through calculation according to the fundus image that satisfies the at least one defined second clarity criterion and the known imaging parameters of the location detection module 700. Herein, the optical parameters of the eye may comprise an optical axis direction of the eye.

In a possible implementation manner of an embodiment of the present application, the location detection module 700 further comprises: a projection submodule 740, configured to project a light spot to the fundus. In a possible implementation manner, a micro projector may be used to implement the function of the projection submodule.

The projected light spot herein may have no specific pattern but only be used to illuminate the fundus.

In an implementation manner of an embodiment of the present application, the projected light spot may comprise a pattern with abundant features. The abundant features of the pattern may be for easy detection and improve detection precision. FIG. 4a is a schematic diagram of a light spot pattern P. The pattern may be formed by a light spot pattern generator, such as frosted glass. FIG. 4b shows an image shot at the fundus when the light spot pattern P is projected.

In order not to affect normal viewing of the eye, the light spot can be an eye-invisible infrared light spot.

At this time, in order to decrease interference from other spectrums:

an eye-invisible light transmission lens may be disposed on an exit surface of the projection submodule 740; and an eye-invisible light transmission lens is disposed on an incident surface of the fundus image acquisition submodule 710.

In a possible implementation manner of an embodiment of the present application, the image processing submodule 730 further comprises:

a projection control unit 734, configured to control, according to a result obtained by the image analysis unit 731, luminance of the light spot projected by the projection submodule 740.

For example, the projection control unit 734 may adjust the luminance self-adaptively according to a feature of the at least one image obtained by the fundus image acquisition submodule 710. Herein, the feature of the at least one image comprises a contrast of the feature of the at least one image, a texture feature, and the like.

Herein, a special case of controlling the luminance of the light spot projected by the projection submodule 740 is turning on or off the projection submodule 740. For example, when a user keeps gazing at a point, the projection submodule may be turned off periodically; or when a fundus of the user is bright enough, the light source may be turned off, and a distance from a gaze point of a current sight line of an eye to the eye can be detected by only using information at the fundus.

In addition, the luminance of the light spot projected by the projection submodule 740 may further be controlled by the projection control unit 734 according to ambient light.

In a possible implementation manner of an embodiment of the present application, the image processing submodule 730 further comprises: an image calibration unit 733, configured to calibrate the image at the fundus, to obtain at least one reference image corresponding to the image presented at the fundus.

The image analysis unit 731 performs comparative calculation on the at least one image obtained by the fundus image acquisition submodule 730 and the reference image, to obtain the fundus image that satisfies the at least one defined second clarity criterion. Herein, the fundus image that satisfies the at least one defined second clarity criterion may be an obtained image that is the least different from the reference image. In this implementation manner, a difference between the currently obtained image and the reference image is calculated by using an existing image processing algorithm, for example, by using a classic automatic phase difference focusing algorithm.

In a possible implementation manner of an embodiment of the present application, the parameter calculation unit 732 comprises:

an eye-optical-axis-direction determining subunit 7321, configured to obtain an optical axis direction of an eye according to a feature of the eye at the time when the fundus image that satisfies the at least one defined second clarity criterion is obtained.

The feature of the eye herein may be acquired from the fundus image that satisfies the at least one defined second clarity criterion, or may be acquired in another manner. A direction of a sight line at which an eye of the user gazes may be obtained according to the optical axis direction of the eye.

In a possible implementation manner of an embodiment of the present application, the eye-optical-axis-direction determining subunit 7321 comprises: a first determining subunit, configured to obtain the optical axis direction of the eye according to a feature of the fundus at the time when the fundus image that satisfies the at least one defined second clarity criterion is obtained. Compared with obtaining the optical axis direction of the eye by using features of a pupil and an eyeball, determining the optical axis direction of the eye by using the feature of the fundus has high precision.

When a light spot pattern is projected to the fundus, a size of the light spot pattern may be bigger than a fundus visible area or may be smaller than the fundus visible area.

When an area of the light spot pattern is smaller than or equal to the fundus visible region, a classic feature points matching algorithm (for example, the SIFT algorithm) may be used to determine the optical axis direction of the eye by detecting a location, of the light spot pattern in the image, relative to the fundus.

When the area of the light spot pattern is bigger than or equal to the fundus visible region, a location, of the light spot pattern in the obtained image, relative to an original light spot pattern (obtained by using the image calibration unit) may be used to determine the optical axis direction or to determine a direction of a sight line of the user.

In another possible implementation manner of an embodiment of the present application, the eye-optical-axis-direction determining subunit 7321 comprises: a second determining subunit, configured to obtain the optical axis direction of the eye according to a feature of an eye pupil at the time when the fundus image that satisfies the at least one defined second clarity criterion is obtained. The feature of the pupil herein may be acquired from the fundus image that satisfies the at least one defined second clarity criterion, or may be acquired in another manner. The obtaining the optical axis direction of the eye by using the feature of the eye pupil belongs to the prior art, and is not described herein again.

In a possible implementation manner of an embodiment of the present application, the image processing submodule 730 further comprises: an eye-optical-axis-direction calibration unit 735, configured to calibrate the optical axis direction of the eye, so as to more precisely determine the foregoing optical axis direction.

In this implementation manner, the known imaging parameters of the location detection module 700 comprise at least one fixed imaging parameter and at least one real-time imaging parameter, wherein the at least one real-time imaging parameter is parameter information of the adjustable lens device at the time when the fundus image that satisfies the at least one defined second clarity criterion is acquired, and the parameter information may be obtained in a manner of real-time recording at the time when the fundus image that satisfies the at least one defined second clarity criterion is acquired.

Figure 7C:
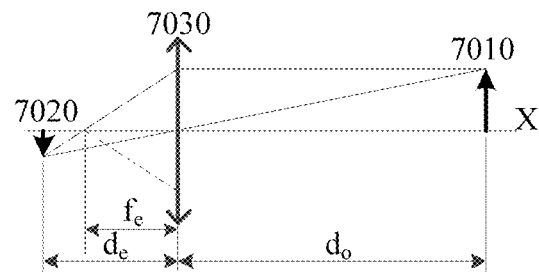
FIG. 7c and FIG. 7d are corresponding optical path diagrams when a location detection module used in a user information acquisition apparatus according to an embodiment of the present application performs location detection.

The distance from the gaze point of the eye to the eye is calculated below, specifically:

FIG. 7c is a schematic diagram of eye imaging, and with reference to a lens imaging formula in a classic optical theory, formula (1) may be obtained from FIG. 7c:

$$\frac{1}{d_o} + \frac{1}{d_e} = \frac{1}{f_e} \qquad (1)$$

$d_o$ and $d_e$ are a distance from a currently observed object 7010 of an eye to an eye equivalent lens 7030 and a distance from a real image 7020 on the retina to the eye equivalent lens 7030, respectively, $f_e$ is an equivalent focal length of the eye equivalent lens 7030, and X is a direction of the sight line of the eye (which may be obtained by using the optical axis direction of the eye).

Figure 7D:
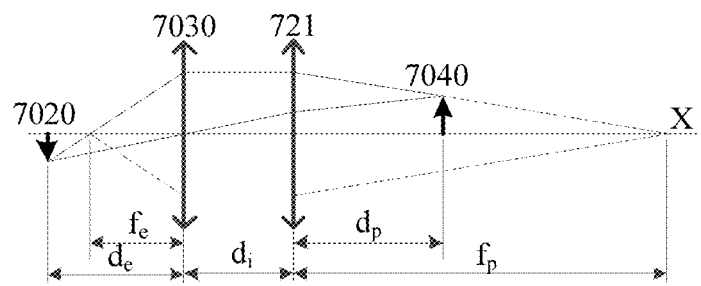

FIG. 7d is a schematic diagram of a distance from a gaze point of an eye to the eye that is obtained according to known imaging parameters of the location detection module 700 and optical parameters of the eye. In FIG. 7d, a light spot 7040 forms a virtual image (not shown in FIG. 7d) through an adjustable lens device 721. Assuming that a distance from the virtual image to the lens is x (not shown in FIG. 7d), the following equation set may be obtained with reference to the formula (1):

$$\begin{cases} \dfrac{1}{d_p} - \dfrac{1}{x} = \dfrac{1}{f_p} \\ \dfrac{1}{d_i + x} + \dfrac{1}{d_e} = \dfrac{1}{f_e} \end{cases} \quad (2)$$

$d_p$ is an optical equivalent distance from the light spot 7040 to the adjustable lens device 721, $d_i$ is an optical equivalent distance from the adjustable lens device 721 to the eye equivalent lens 7030, $f_p$ is a focal length value of the adjustable lens device 721, and $d_e$ is a distance from the eye equivalent lens 7030 to the adjustable lens device 721.

As shown in formula (3), a distance $d_o$ from the currently observed object 7010 (the gaze point of the eye) to the eye equivalent lens 7030 may be obtained from (1) and (2):

$$d_o = d_i + \dfrac{d_p \cdot f_p}{f_p - d_p} \quad (3)$$

The optical axis direction of the eye may be obtained due to previous records and according to the foregoing distance from the observed object 7010 to the eye that is obtained through calculation, and therefore, the location of the gaze point of the eye can be easily obtained, which provides a basis for subsequent interaction related to the eye.

Figure 8:
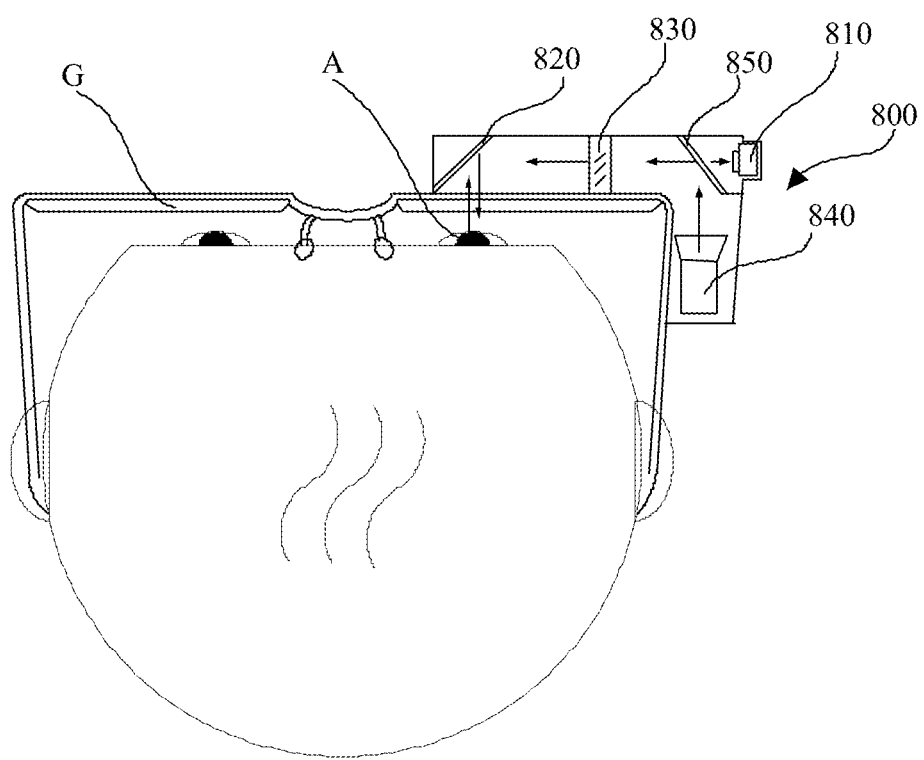
FIG. 8 is a schematic diagram of applying a user information acquisition apparatus to glasses according to an embodiment of the present application.

FIG. 8 is an embodiment of a location detection module 800 applied to a pair of glasses G according to a possible implementation manner of the embodiment of the present application, which comprises content recorded in the implementation manner shown in FIG. 7b. Specifically: as can be seen from FIG. 8, in this implementation manner, a module 800 of this implementation manner is integrated at the right side of the pair of glasses G (which is not limited thereto), and comprises:

a micro camera 810, having a same function as the fundus image acquisition submodule recorded in the implementation manner of FIG. 7b, and in order not to affect a sight line of a user for normally viewing an object, the micro camera 810 is disposed at the outer right side of the pair of glasses G;

a first beam splitter 820, having a same function as the first beam splitting unit recorded in the implementation manner of FIG. 7b, disposed with a certain tilt angle at an intersection point of a gaze direction of an eye A and an incident direction of the camera 810, and configured to transmit light entering the eye A from an observed object and reflect light from the eye to the camera 810; and a focal length adjustable lens 830, having a same function as the focal length adjustable lens recorded in the implementation manner of FIG. 7b, located between the first beam splitter 820 and the camera 810, configured to adjust a focal length value in real time, to cause the camera 810 to shoot, at a certain focal length value, a fundus image that satisfies at least one defined second clarity criterion at a fundus.

In this implementation manner, the image processing submodule is not shown in FIG. 8, and functions of the image processing submodule is the same as that of the image processing submodule shown in FIG. 7b.

Generally, the fundus is not bright enough, and therefore, it is better to illuminate the fundus, and in this implementation manner, the fundus is illuminated by using a light source 840. In order not to affect the user experience, the light source 840 herein may be an eye-invisible light source, preferably, may be a near-infrared light source which does not impose too much effect on the eye A and to which the camera 810 is relatively sensitive.

In this implementation manner, the light source 840 is located at the outer side of the right side of a spectacle frame, and therefore, a second beam splitter 850 and the first beam splitter 820 are required to jointly complete transferring, to the fundus, light emitted by the light source 840. In this implementation manner, the second beam splitter 850 is located in front of an incident surface of the camera 810, and therefore, light from the fundus to the second splitter 850 also needs to be transmitted.

As can be seen in this implementation manner, in order to improve the user experience and the acquisition clarity of the camera 810, the first beam splitter 820 may have the characteristics of high reflectivity to infrared ray and high transmissivity to visible light. For example, an infrared reflective film may be disposed at one side, of the first beam splitter 820, facing the eye A, to achieve the characteristics described above.

As can be seen from FIG. 8, in this implementation manner, the location detection module 800 is located at one side, of a lens of the pair of glasses G, away from the eye A, and therefore, the lens may be considered as a part of the eye A during calculation of an optical parameter of the eye, and at this time, there is no need to know optical characteristics of the lens.

In another implementation manner of the embodiment of the present application, the location detection module 800 may be located at one side, of the lens of the pair of glasses G, close to the eye A, and at this time, an optical characteristic parameter of the lens needs to be obtained in advance, and an influence factor of the lens needs to be considered when the distance from the gaze point to an eye of a user is calculated.

In this embodiment, the light emitted by the light source 840 is reflected by the second beam splitter 850, transmitted by the focal length adjustable lens 830, and reflected by the first beam splitter 820, and then passes through the lens of the pair of glasses G to enter the eye of the user, and finally arrives at the retina of the fundus. The camera 810 shoots an image at the fundus through a pupil of the eye A and an optical path formed by using the first beam splitter 820, the focal length adjustable lens 830, and the second beam splitter 850.

In a possible implementation manner, other parts of the apparatus according to the embodiment of the present application are implemented in the pair of glasses G, and both the location detection module and the projection module may comprise: a device having a projection function (such as an information projection submodule of the foregoing projection module, and a projection submodule of the location detection module), an imaging device with an imaging parameter being adjustable (such as a parameter adjustment submodule of the foregoing projection module, and an adjustable imaging submodule of the location detection module), and the like, and therefore, in a possible implementation manner of the embodiment of the present application, functions of the location detection module and the projection module are implemented by a same device.

As shown in FIG. 8, in a possible implementation manner of an embodiment of the present application, in addition to being configured to illuminate the location detection module, the light source 840 may further be configured to assist in projecting the user related information as a light source of the information projection submodule of the projection module. In a possible implementation manner, the light source 840 may separately project invisible light to illuminate the location detection module, and visible light to assist in projecting the user related information. In another possible implementation manner, the light source 840 may further switch between the invisible light and the visible light in a time division manner. In still another possible implementation manner, the location detection module may use the user related information to complete the function of illuminating the fundus.

In a possible implementation manner of an embodiment of the present application, in addition to functioning as parameter adjustment submodules of the projection module, the first beam splitter 820, the second beam splitter 850, and the focal length adjustable lens 830 may further function as adjustable imaging submodules of the location detection module. Herein, in a possible implementation manner, a focal length of the focal length adjustable lens 830 may be adjusted according to regions, wherein different regions respectively correspond to the location detection module and the projection module, and focal lengths may be different. Alternatively, a focal length of the focal length adjustable lens 830 is adjusted as a whole. However, a front end of a light sensitive unit (such as CCD) of the micro camera 810 of the location detection module is further provided with another optical device, configured to implement assisted adjustment of the imaging parameter of the location detection module. In addition, in another possible implementation manner, it may be configured to cause an optical length from a light emitting surface of the light source 840 (that is, a projection location of the user related information) to an eye to be the same as an optical length from the eye to the micro camera 810, the focal length adjustable lens 830 is adjusted until the micro camera 810 receives the clearest image at the fundus, and the user related information projected by the light source 840 precisely forms a clear image at the fundus.

As can be seen from the above, in the embodiments of the present application, functions of the location detection module and the projection module of the user information acquisition apparatus may be implemented by using a same device, to cause the whole system to have a simple structure and small size, and be carried conveniently.

Figure 9:
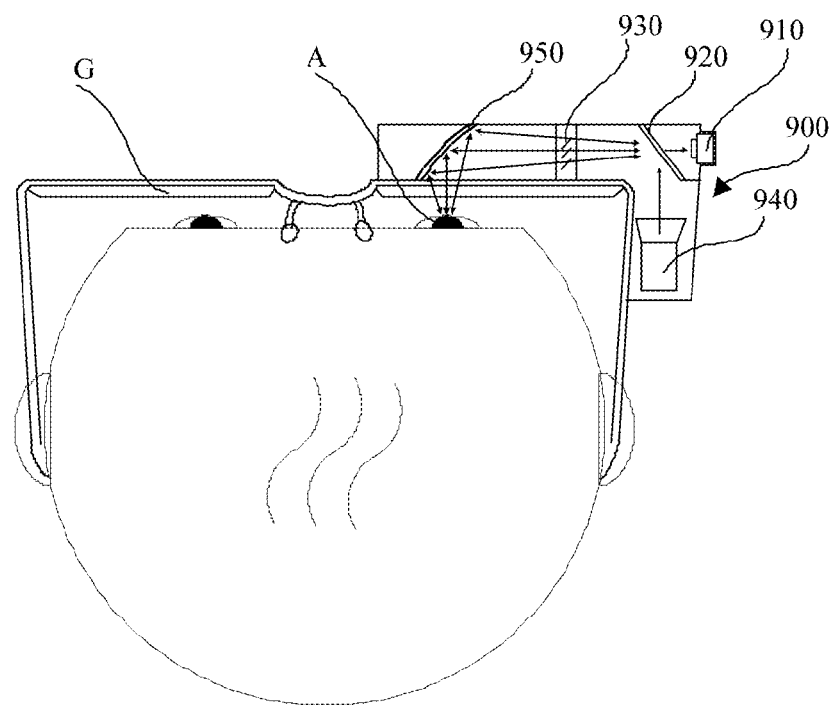
FIG. 9 is a schematic diagram of applying another user information acquisition apparatus to glasses according to an embodiment of the present application.

FIG. 9 is a schematic structural diagram of a location detection module 900 of another implementation manner of the embodiment of the present application. As can be seen from FIG. 9, this implementation manner is similar to the implementation manner shown in FIG. 8, comprising a micro camera 910, a second beam splitter 920, and a focal length adjustable lens 930. Differences lie in that in this implementation manner, a projection submodule 940 is configured to project a light spot pattern, and the first beam splitter in the implementation manner of FIG. 8 is replaced with a curved beam splitter 950 as a curved beam splitting device.

The curved beam splitter 950 is used herein to transfer, separately corresponding to locations of a pupil at the time when optical axis directions of an eye are different, an image presented at the fundus to a fundus image acquisition submodule. In this way, the camera can shoot a mixed and superimposed image formed from various angles of an eyeball. However, only an image of the part at the fundus passing through a pupil can be clearly formed on the camera, and other parts are out of focus and fail to form an image clearly, and therefore, the imaging of the part at the fundus are not interfered severely, and the features of the part at the fundus may still be detected. Therefore, compared with the implementation manner shown in FIG. 8, this implementation manner can well obtain an image at the fundus when the eye gazes at different directions, to cause the location detection module of this implementation manner to be more widely applied with higher detection precision.

In a possible implementation manner of an embodiment of the present application, other parts of the user information acquisition apparatus according to the embodiment of the present application are implemented in the pair of glasses G. In this implementation manner, the location detection module and the projection module may also be multiplexed. Similar to the embodiment shown in FIG. 8, at this time, the projection submodule 940 may project a light spot pattern and the user related information simultaneously or by switching in a time division manner; or the location detection module detects the projected user related information as the light spot pattern. Similar to the embodiment shown in FIG. 8, in a possible implementation manner of the embodiment of the present application, in addition to functioning as parameter adjustment submodules of the projection module, the first beam splitter 920, the second beam splitter 950, and the focal length adjustable lens 930 may further function as adjustable imaging submodules of the location detection module.

At this time, the second beam splitter 950 is further configured to perform optical path transferring, separately corresponding to locations of a pupil at the time when optical axis directions of an eye are different, between the projection module and the fundus. After passing through the curved second beam splitter 950, the user related information projected by the projection submodule 940 is deformed, and therefore, in this implementation manner, the projection module comprises:

a counter-deformation processing module (not shown in FIG. 9), configured to perform, on the user related information, counter-deformation processing corresponding to the curved beam splitting device, to cause the fundus to receive the user related information that needs to be presented.

In an implementation manner, the projection module is configured to project the user related information to a fundus of the user three-dimensionally.

The user related information comprises three-dimensional information separately corresponding to two eyes of the user, and the projection module separately projects corresponding user related information to the two eyes of the user.

Figure 10:
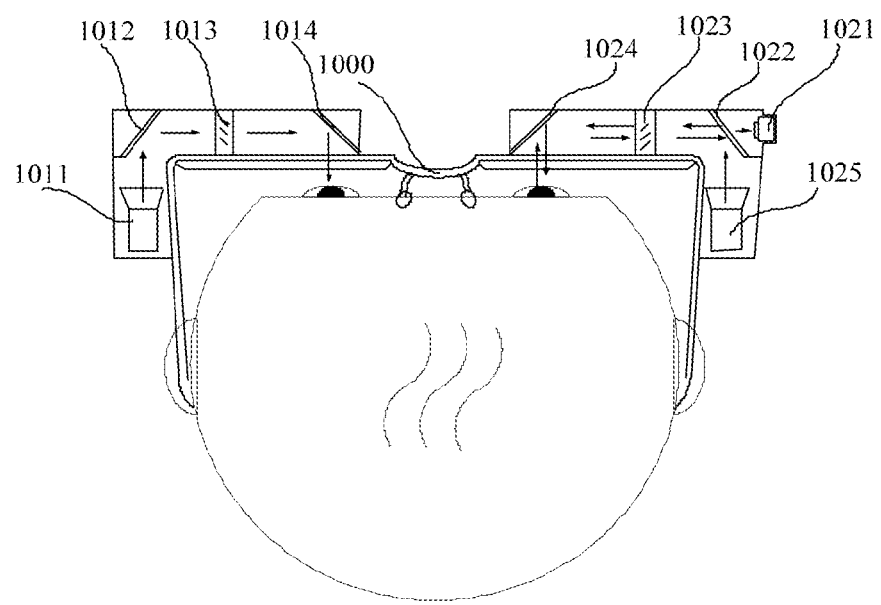
FIG. 10 is a schematic diagram of applying still another user information acquisition apparatus to glasses according to an embodiment of the present application.

As shown in FIG. 10, in a case in which three-dimensional display is required, the user information acquisition apparatus 1000 needs to dispose two sets of projection modules separately corresponding to two eyes of a user, comprising:

a first projection module corresponding to the left eye of the user; and a second projection module corresponding to the right eye of the user.

A structure of the second projection module is similar to a structure combined with the function of the location detection module and recorded in the embodiment of FIG. 10, and is also a structure that can implement both the function of the location detection module and the function of the projection module, wherein the structure comprises a micro camera 1021, a second beam splitter 1022, a second focal length adjustable lens 1023, and a first beam splitter 1024 (wherein an image processing submodule of the location detection module is not shown in FIG. 10) that have same functions as those in the embodiment shown in FIG. 10. A difference lies in that in this implementation manner, the projection submodule is a second projection submodule 1025 that can project user related information corresponding to the right eye. The projection submodule may also be configured to detect a location of a gaze point of an eye of the user, and clearly project, to the fundus of the right eye, the user related information corresponding to the right eye.

A structure of the first projection module is similar to a structure of the second projection module 1020, but the first projection module does not have a micro camera, and is not combined with the function of the location detection module. As shown in FIG. 10, the first projection module comprises:

a first projection submodule 1011, configured to project, to the fundus of the left eye, user related information corresponding to the left eye;

a focal length adjustable lens 1013, configured to adjust an imaging parameter between the first projection submodule 1011 and the fundus, to cause corresponding user related information to be presented at the fundus of the left eye clearly, and to cause the user to see the user related information presented in the image;

a third beam splitter 1012, configured to perform optical path transferring between the first projection submodule 1011 and the first focal length adjustable lens 1013; and a fourth beam splitter 1014, configured to perform optical path transferring between the first focal length adjustable lens 1013 and the fundus of the left eye.

This embodiment causes the user related information seen by the user to be displayed with a proper three-dimensional effect, thereby bringing better user experience. In addition, when the user related information input by the user comprises three-dimensional space information, the foregoing three-dimensional projection causes the user to see the three-dimensional space information. For example, when a user needs to make a specific gesture at a specific location in the three-dimensional space to correctly input the user related information, the foregoing method according to the embodiment of the present application causes the user to see three-dimensional user related information, and know the specific location and the specific gesture, and further causes the user to make the gesture, at the specific location, prompted by the user related information. At this time, even if another person sees the gesture action made by the user, the person cannot know the space information, which causes the user related information to have a better confidentiality effect.

FIG. 11 is a schematic structural diagram of yet another user information acquisition apparatus 1100 according to an embodiment of the present application. A specific embodiment of the present application does not limit specific implementation of the user information acquisition apparatus 1100. As shown in FIG. 11, the user information acquisition apparatus 1100 may comprise:

a processor 1110, a communications interface 1120, a memory 1130, and a communications bus 1140, wherein:

the processor 1110, the communications interface 1120, and the memory 1130 communicate with each other by using the communications bus 1140.

The communications interface 1120 is configured to communicate with a network element, such as a client.

The processor 1110 is configured to execute a program 1132, and specifically, may execute related steps in the foregoing method embodiment.

Specifically, the program 1132 may comprise program code, wherein the program code comprises computer operating instructions.

The processor 1110 may be a central processing unit (CPU), or an application-specific integrated circuit (ASIC), or one or more integrated circuits configured to implement the embodiment of the present application.

The memory 1130 is configured to store the program 1132. The memory 1130 may comprise a high-speed RAM, or may comprise a non-volatile memory, for example, at least one magnetic disk memory. The program 1132 may specifically be configured to cause the user information acquisition apparatus 1100 to perform the following steps:

acquiring an image comprising at least one digital watermark;

acquiring user related information corresponding to a current user and comprised in the at least one digital watermark, wherein the user related information comprises application startup information used to start a corresponding application; and projecting the user related information to a fundus of the user.

For specific implementation of the steps in the program 1132, reference may be made to corresponding description of corresponding steps and units in the foregoing embodiment, which is not described herein again. A person skilled in the art may clearly understand that for convenience and ease of description, for a specific working process of the devices and modules described above, reference may be made to corresponding process description in the preceding method embodiments, which is not described herein again.

In addition, the present application further provides a computer readable medium, comprising a computer readable instruction which, when executed, executes the following operation: executing the operations of steps S110, S120, and S130 in the method embodiment shown in FIG. 1.

As shown in FIG. 12, an embodiment of the present application further provides a wearable device 1200, comprising the user information acquisition apparatus 1210 recorded in the foregoing embodiment.

The wearable device is a pair of glasses. In some implementation manners, the pair of glasses may have, for example, a structure shown in FIG. 8 to FIG. 10.

As shown in FIG. 13, an embodiment of the present application provides a user information interaction method, comprising:

S1310: Embed at least one digital watermark in an image, wherein the digital watermark comprises at least one piece of user related information corresponding to at least one user, and the user related information comprises application startup information used to start a corresponding application.

Herein, the digital watermark may be classified into two types, namely, a symmetrical watermark and an asymmetrical watermark, according to symmetry. Conventionally, a symmetrical watermark is embedded and detected by using a same key. In this case, once a method and a key for detection are disclosed, the watermark is removed from a digital carrier very easily. However, an asymmetrical watermark technology embeds a watermark by using a private key, and extracts and verifies the watermark by using a public key. In this way, an attacker can hardly destroy or remove, by using the public key, the watermark that is embedded by using the private key. Therefore, in an embodiment of the present application, the asymmetrical digital watermark is used.

In a possible implementation manner of an embodiment of the present application, the image comprises a login interface, of a user environment, displayed by a device.

The application startup information is used to directly start, on the login interface, the corresponding application in the user environment corresponding to the user.

In an embodiment of the present application, the user related information that needs to be comprised and embedded in the watermark may be predefined by the user according to an individualized demand of the user, or may be actively configured by a system for the user.

In a possible implementation manner of the embodiment of the present application, the user related information further comprises: user authentication information for the user to log in to the user environment.

For implementation of the foregoing steps, refer to corresponding description in the method embodiments shown in FIG. 1 to FIG. 3, which is not described herein again.

In a possible implementation manner of an embodiment of the present application, the method further comprises:
receiving input application startup information; and
starting a corresponding application according to the received application startup information.

In an embodiment of the present application, after acquiring application startup information according to the foregoing methods or apparatuses in the embodiments described in FIG. 1 to FIG. 12, the user inputs corresponding application startup information as required, to cause the method according to the embodiment of the present application to receive the input application startup information, and then start a corresponding application according to the received application startup information.

For example, in the embodiment shown in FIG. 3, the user sees the application startup information in the image shown in FIG. 3. It is used as an example that the user needs to use the browser function. At this time, the user draws an "e"-shaped track on a device displaying the image, and in the method according to the embodiment of the present application, after the "e"-shaped track is received, the browser application is directly started.

The method according to the embodiments of the present application causes the user to start a required application conveniently, directly, and rapidly, thereby improving the user experience.

It should be understood that in the embodiments of the present application, the sequence numbers of the foregoing steps do not imply an execution sequence, and the execution sequence of the steps should be determined according to the functions and inherent logic, which is not intended to limit the implementation process of the embodiment of the present application.

Figure 14:
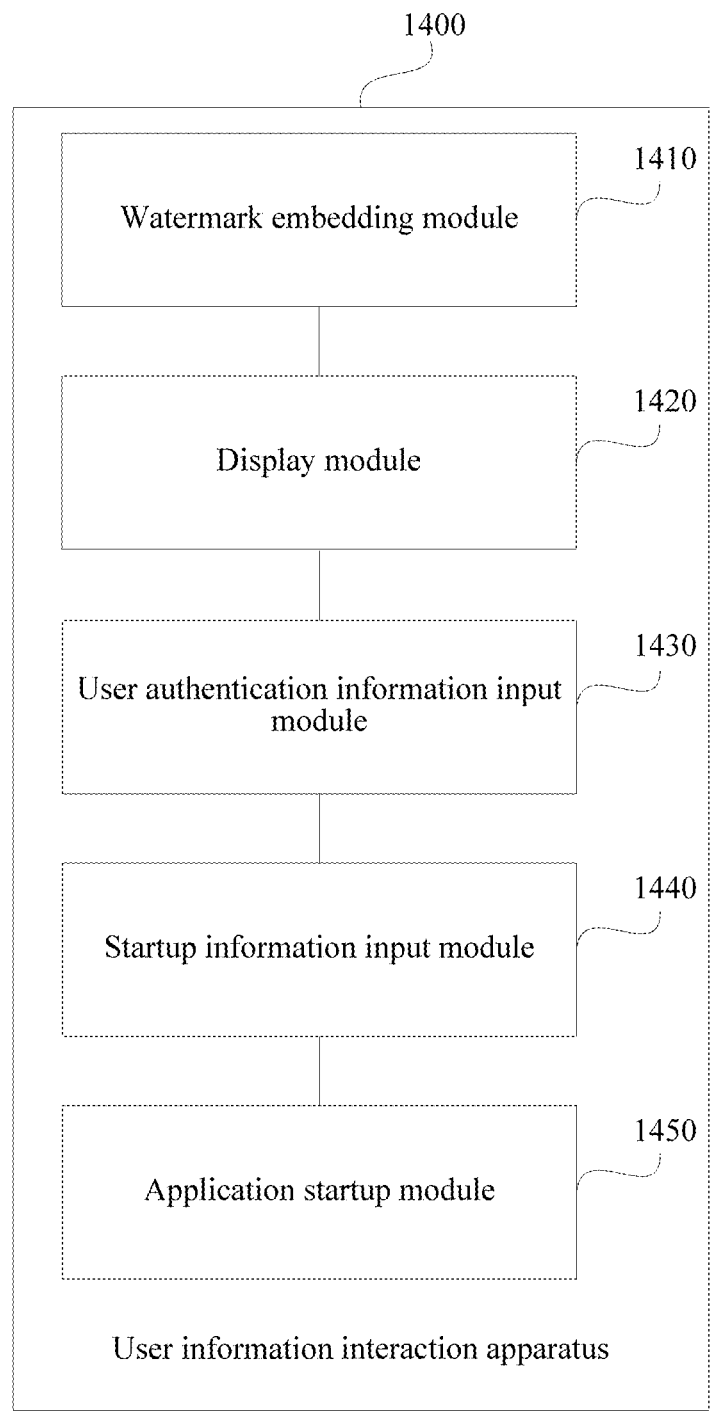
FIG. 14 is a schematic block diagram of a structure of a user information interaction apparatus according to an embodiment of the present application.

As shown in FIG. 14, the present application further provides a user information interaction apparatus 1400, comprising:
a watermark embedding module 1410, configured to embed at least one digital watermark in an image, wherein the digital watermark comprises at least one piece of user related information corresponding to at least one user, and the user related information comprises application startup information used to start a corresponding application.

In a possible implementation manner of an embodiment of the present application, the apparatus 1400 further comprises:
a display module 1420, configured to display a login interface of a user environment, wherein the image comprises the login interface; and
the application startup information is used to directly start, on the login interface, the corresponding application in the corresponding user environment.

In a possible implementation manner of the embodiment of the present application, the user related information further comprises: user authentication information for the user to log in to the user environment.

The apparatus further comprises a user authentication information input module 1430, configured to input the user authentication information.

In a possible implementation manner of an embodiment of the present application, the apparatus further comprises:
a startup information input module 1440, configured to receive the input application startup information; and
an application startup module 1450, configured to start a corresponding application according to the received application startup information.

For implementation of the functions of the modules in this embodiment, refer to corresponding description in the embodiments shown in FIG. 1 to FIG. 13, which is not described herein again.

Figure 15:
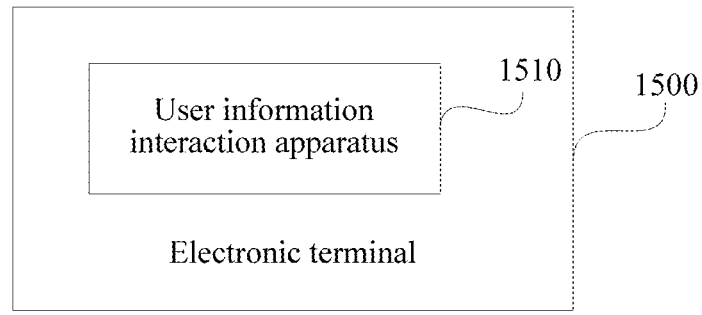
FIG. 15 is a schematic block diagram of a structure of an electronic terminal according to an embodiment of the present application.

As shown in FIG. 15, an embodiment of the present application further provides an electronic terminal 1500, comprising the foregoing user information interaction apparatus 1510.

In a possible implementation manner of an embodiment of the present application, the electronic terminal 1500 is an electronic device, such as a mobile phone, a tablet computer, a computer, or an electronic access controller.

A person of ordinary skill in the art may be aware that the various exemplary units and steps of method described with reference to the embodiments disclosed herein can be implemented by electronic hardware, or a combination of computer software and electronic hardware. Whether the functions are executed by hardware or software depends on particular applications and design constraint conditions of the technical solutions. A person skilled in the art can use different methods to implement the described functions for each particular application, but it should not be considered that the implementation goes beyond the scope of the present invention.

When implemented in the form of a software function unit and sold or used as a stand-alone product, the functions may be stored in a computer-readable storage medium. Based on such understanding, the essence of the technical solutions of the present invention, or a part contributing to the prior art, or a part of the technical solution may be embodied in the form of a software product. The computer software product may be stored in a storage medium, and comprises several instructions for instructing a computer device (which may be a personal computer, a server, or a network device) to execute all or a part of the steps of the method in any embodiment of the present invention. The storage medium may be any medium that is capable of storing program code, such as a USB flash drive, a removable hard disk, a read-only memory (ROM), a random access memory (RAM), a magnetic disk, or an optical disc.

The foregoing implementation manners are merely used to describe the present application, and are not intended to limit the present application. A person of ordinary skill in related technical field can make various changes and variations without departing from the spirit and scope of the present application. Therefore, all equivalent technical solutions fall within the scope of the present application, and the patent protection scope of the present application shall be subject to the claims.

What is claimed is:

1. A user information acquisition method, comprising:
acquiring an image comprising at least one digital watermark;
acquiring user related information corresponding to a current user and comprised in the at least one digital watermark, wherein the user related information comprises application startup information used to start a corresponding application; and
projecting the user related information to a fundus of the user.

2. The method according to claim 1, wherein the image comprises a login interface of a user environment displayed by a device; and
the application startup information is used to directly start, on the login interface, the corresponding application in the user environment corresponding to the current user.

3. The method according to claim 2, wherein the user related information further comprises: user authentication information for the current user to log in to the user environment.

4. The method according to claim 1, wherein before the acquiring user related information corresponding to a current user and comprised in the at least one digital watermark, the method further comprises: authenticating the current user.

5. The method according to claim 1, wherein the acquiring an image comprising at least one digital watermark comprises:
acquiring the image by means of shooting.

6. The method according to claim 1, wherein the acquiring an image comprising at least one digital watermark comprises:
acquiring the image by means of receiving from an external device.

7. The method according to claim 1, wherein the acquiring user related information corresponding to a current user and comprised in the at least one digital watermark comprises:
extracting the user related information from the image.

8. The method according to claim 1, wherein the acquiring user related information corresponding to a current user and comprised in the at least one digital watermark comprises:
sending the image to an external device; and
receiving the user related information in the image from the external device.

9. The method according to claim 1, wherein the projecting the user related information to a fundus of the user comprises:
projecting the user related information; and
adjusting at least one projection imaging parameter of an optical path between a projection location of the user related information and an eye of the user until an image of the user related information formed at the fundus of the user satisfies at least one defined first clarity criterion.

10. The method according to claim 1, wherein the projecting the user related information to a fundus of the user further comprises:
aligning, at the fundus of the user, the projected user related information with an image seen by the user.

11. The method according to claim 10, wherein the method further comprises:
detecting a location, of a gaze point of the user, relative to the user, wherein
the aligning, at the fundus of the user, the projected user related information with an image seen by the user comprises:
aligning, at the fundus of the user according to the location, of the gaze point of the user, relative to the user, the projected user related information with the image seen by the user.

12. The method according to claim 1, wherein the projecting the user related information to a fundus of the user further comprises:
projecting the user related information to the fundus of the user three-dimensionally.

13. The method according to claim 12, wherein
the user related information comprises three-dimensional information separately corresponding to two eyes of the user; and
the projecting the user related information to a fundus of the user comprises:
separately projecting corresponding user related information to the two eyes of the user.

14. A user information acquisition apparatus, comprising:
an image acquisition module, configured to acquire an image comprising at least one digital watermark;
an information acquisition module, configured to acquire user related information corresponding to a current user and comprised in the at least one digital watermark, wherein the user related information comprises application startup information used to start a corresponding application; and
a projection module, configured to project the user related information to a fundus of the user.

15. The apparatus according to claim 14, wherein the apparatus further comprises: a user authentication module, configured to authenticate the current user.

16. The apparatus according to claim 14, wherein the image acquisition module comprises:
a shooting submodule, configured to shoot the image.

17. The apparatus according to claim 14, wherein the image acquisition module comprises:
a first communications submodule, configured to receive the image from an external device.

18. The apparatus according to claim 14, wherein the information acquisition module comprises:
an information extraction submodule, configured to extract the user related information from the image.

19. The apparatus according to claim 14, wherein the information acquisition module comprises:
a second communications submodule, configured to:
send the image to an external device; and
receive the user related information in the image from the external device.

20. The apparatus according to claim 14, wherein the projection module comprises:
an information projection submodule, configured to project the user related information; and
a parameter adjustment submodule, configured to adjust at least one projection imaging parameter of an optical path between the information projection submodule and an eye of the user until an image of the user related information formed at the fundus of the user satisfies at least one defined first clarity criterion.

21. The apparatus according to claim 14, wherein the projection module further comprises:
an alignment and adjustment submodule, configured to align, at the fundus of the user, the projected user related information with an image seen by the user.

22. The apparatus according to claim 21, wherein the apparatus further comprises:
a location detection module, configured to detect a location, of a gaze point of the user, relative to the user, wherein the alignment and adjustment submodule is configured to align, at the fundus of the user according to the location, the projected user related information with the image seen by the user.

23. The apparatus according to claim 14, wherein the projection module is configured to:
  project the user related information to the fundus of the user three-dimensionally.

24. The apparatus according to claim 23, wherein
  the user related information comprises three-dimensional information separately corresponding to two eyes of the user; and
  the projection module is configured to separately project corresponding user related information to the two eyes of the user.

25. The apparatus according to claim 14, wherein the apparatus is installed on a wearable device.

26. The wearable device according to claim 25, wherein the wearable device is a pair of glasses.

27. A non-transitory computer readable storage medium, wherein the computer readable storage medium comprises executable instructions, and when a central processing unit (CPU) of a wearable device executes the executable instructions, the executable instructions are used to enable the wearable device to perform the following method:
  acquiring an image comprising at least one digital watermark;
  acquiring user related information corresponding to a current user and comprised in the at least one digital watermark, wherein the user related information comprises application startup information used to start a corresponding application; and
  projecting the user related information to a fundus of the user.

28. A user information acquisition apparatus, comprising a central processing unit (CPU) and a memory, wherein the memory stores computer executable instructions, the CPU is connected to the memory by using a communications bus, and when the CPU executes the computer executable instructions stored in the memory, the user information acquisition apparatus performs the following method:
  acquiring an image comprising at least one digital watermark;
  acquiring user related information corresponding to a current user and comprised in the at least one digital watermark, wherein the user related information comprises application startup information used to start a corresponding application; and
  projecting the user related information to a fundus of the user.

* * * * *